United States Patent
Kida et al.

(10) Patent No.: US 9,285,937 B2
(45) Date of Patent: Mar. 15, 2016

(54) DISPLAY DEVICE WITH TOUCH DETECTION FUNCTION, DRIVE METHOD THEREOF, AND ELECTRONIC APPARATUS

(71) Applicant: Japan Display Inc., Tokyo (JP)

(72) Inventors: Yoshitoshi Kida, Tokyo (JP); Koji Noguchi, Tokyo (JP); Yasuyuki Teranishi, Tokyo (JP); Hiroshi Mizuhashi, Tokyo (JP); Kohei Azumi, Tokyo (JP)

(73) Assignee: Japan Display Inc., Tokyo (JP)

( * ) Notice: Subject to any disclaimer, the term of this patent is extended or adjusted under 35 U.S.C. 154(b) by 26 days.

(21) Appl. No.: 14/098,157

(22) Filed: Dec. 5, 2013

(65) Prior Publication Data

US 2014/0152617 A1 Jun. 5, 2014

(30) Foreign Application Priority Data

Dec. 5, 2012 (JP) .................................. 2012-266783
Dec. 5, 2013 (JP) .................................. 2013-251695

(51) Int. Cl.
 *G06F 3/045* (2006.01)
 *G06F 3/044* (2006.01)
 *G06F 3/041* (2006.01)

(52) U.S. Cl.
 CPC .............. *G06F 3/044* (2013.01); *G06F 3/0418* (2013.01)

(58) Field of Classification Search
 CPC ........ G06F 3/044; G06F 3/0418; G06F 3/012
 USPC .................................................. 345/173–174
 See application file for complete search history.

(56) References Cited

U.S. PATENT DOCUMENTS

| | | | |
|---|---|---|---|
| 9,092,086 B2 | 7/2015 | Krah et al. | |
| 2008/0158180 A1* | 7/2008 | Krah ................... | G06F 3/03545 345/173 |
| 2011/0241651 A1 | 10/2011 | Oda | |
| 2011/0267293 A1* | 11/2011 | Noguchi et al. ............. | 345/173 |
| 2012/0050217 A1 | 3/2012 | Noguchi et al. | |

(Continued)

FOREIGN PATENT DOCUMENTS

| | | |
|---|---|---|
| JP | 2009-244958 | 10/2009 |
| JP | 2012-048295 | 3/2012 |

(Continued)

OTHER PUBLICATIONS

European search report issued in connection with European Patent Application No. 13195340.8, dated Feb. 24, 2015. (6 pages).

(Continued)

*Primary Examiner* — Temesgh Ghebretinsae
*Assistant Examiner* — Kwin Xie
(74) *Attorney, Agent, or Firm* — K&L Gates LLP

(57) ABSTRACT

According to an aspect, a display device with a touch detection function includes: a scan drive unit that supplies a touch drive signal to a touch detection element in a touch detection operation period different from a display operation period in which a pixel signal and a display drive signal are sequentially supplied to display elements to perform display scanning; and a noise detector that detects noise included in a frequency component sampled by a touch detection unit. When the noise detector detects the noise, the scan drive unit changes a frequency of the touch drive signal in the touch detection operation period and supplies the changed frequency to the touch detection element.

6 Claims, 23 Drawing Sheets

(56) References Cited

U.S. PATENT DOCUMENTS

| | | | | |
|---|---|---|---|---|
| 2012/0262390 | A1* | 10/2012 | Kida et al. | 345/173 |
| 2013/0221993 | A1* | 8/2013 | Ksondzyk | H03K 17/955 324/681 |
| 2013/0314361 | A1* | 11/2013 | Saitoh | G06F 3/0412 345/173 |

FOREIGN PATENT DOCUMENTS

| | | |
|---|---|---|
| JP | 2012-221423 | 11/2012 |
| KR | 10-2012-0019371 | 3/2012 |
| TW | M363639 | 8/2009 |

OTHER PUBLICATIONS

Korean Office Action issued Apr. 30, 2015, for corresponding Korean Appln. No. 10-2013-146517 (7 pages).

Taiwan Office Action issued Jul. 14, 2015, for corresponding Taiwan Appln. No. 102144670 (10 pages).

* cited by examiner

DISPLAY DEVICE WITH TOUCH DETECTION FUNCTION, DRIVE METHOD THEREOF, AND ELECTRONIC APPARATUS

CROSS REFERENCES TO RELATED APPLICATIONS

The present application claims priority to Japanese Priority Patent Application JP 2012-266783 filed in the Japan Patent Office on Dec. 5, 2012, and JP 2013-251695 filed in the Japan Patent Office on Dec. 5, 2013, the entire content of which is hereby incorporated by reference.

BACKGROUND

1. Technical Field

The present disclosure relates to a display device capable of detecting an external proximity object, a drive method thereof, and an electronic apparatus including the display device. More particularly, the present disclosure relates to a display device with a touch detection function capable of detecting an external proximity object based on a change in a capacitance, a drive method thereof, and an electronic apparatus including the display device.

2. Description of the Related Art

Recently, a touch detection device, which is referred to as, so-called a touch panel, capable of detecting an external proximity object is attracting attention. The touch panel is used for a display device with a touch detection function in which the touch panel is mounted on or integrated into the display device such as a liquid-crystal display device. The display device with a touch detection function displays various button images and the like on the display device, and this allows information input using the touch panel instead of normal mechanical buttons. The display device with a touch detection function having such a touch panel does not require an input device such as a keyboard, a mouse, or a keypad, and, therefore, the use thereof in portable information devices such as mobile phones is on the rise as well as in computers.

A method for the touch detection device includes those such as an optical type, a resistive type, and a capacitive type. A capacitive-type touch detection device used for a mobile device or so has a comparatively simple structure and is capable of implementing low power consumption. For example, Japanese Patent Application Laid-open Publication No. 2009-244958 describes a display device in which a common electrode for display originally provided in the display device doubles as one of a pair of touch sensor electrodes and the other electrode (touch detection electrode) is arranged so as to intersect with the common electrode. A capacitance is formed between the common electrode and the touch detection electrode, and the formed capacitance changes according to an external proximity object. The display device is configured to use this feature and analyze a touch detection signal appearing at the touch detection electrode when a drive signal for touch detection is applied to the common electrode, and to thereby detect the external proximity object. The display device performs a display operation by sequentially applying a drive signal to the common electrode and performing line-sequential scanning, and analyzes a touch detection signal appearing at the touch detection electrode in a period of display scanning according to the drive signal, thus performing the touch detection operation.

Japanese Patent Application Laid-open Publication No. 2012-048295 (JP-A-2012-048295) describes a display device with a touch detection function that performs touch detection by sampling a detection result sent from a touch detection element in a period shorter than a period of display scanning in a touch detection operation period different from a display operation period.

It is required that the display device with a touch detection function is not easily affected by noise in terms of operation stability and touch detection sensitivity. For example, when a capacitive-type touch detection device is coupled to an alternating current (AC) power supply, noise (hereinafter, "external noise") due to the AC power supply or the like is likely to be propagated to the touch detection device entirely caused by a difference between a ground potential of human body and a signal ground potential of the AC power supply. Moreover, if the touch detection function is integrated into the display device or the touch detection device is mounted on the display device, various drive signals used in the display device are likely to be transmitted to the touch detection device as noise (hereinafter, "internal noise").

In the technology described in JP-A-2012-048295, by sampling the detection result sent from the touch detection element in a period shorter than a period of display scanning in the touch detection operation period different from the display operation period, the touch detection is performed, which enables the influence of the internal noise on the display device to be suppressed. Furthermore, there is a method of providing a filter against the external noise in order to suppress the influence of the external noise on the touch detection device.

However, the filter against the external noise needs to transmit a frequency at which the detection result sent from the touch detection element is sampled, and therefore if the frequency of the external noise and the frequency at which the detection result sent from the touch detection element is sampled are close to each other, an effect to suppress the external noise may be reduced.

For the foregoing reasons, there is a need for a display device with a touch detection function, a drive method of the display device with a touch detection function, and an electronic apparatus that enable performing touch detection with the influence of external noise reduced.

SUMMARY

According to an aspect, a display device with a touch detection function includes: a plurality of display elements that perform a display operation based on a pixel signal and a display drive signal; a touch detection element that detects an external proximity object in accordance with a touch drive signal; a scan drive unit that supplies the touch drive signal to the touch detection element in a touch detection operation period different from a display operation period in which the pixel signal and the display drive signal are sequentially supplied to the display elements to perform display scanning; a touch detection unit that performs touch detection by sampling a detection result of the touch detection element at a timing synchronized with the touch drive signal; and a noise detector that detects noise included in a frequency component sampled by the touch detection unit. The scan drive unit changes a frequency of the touch drive signal in the touch detection operation period and supplies the changed frequency to the touch detection element, when the noise detector detects the noise.

According to another aspect, a drive method is of a display device with a touch detection function including: a plurality of display elements that perform a display operation based on a pixel signal and a display drive signal; and a touch detection element that detects an external proximity object in accordance with a touch drive signal. The drive method includes:

sequentially supplying the pixel signal and the display drive signal to the display elements in a time division manner to perform display scanning, in a display operation period; supplying the touch drive signal to the touch detection element, in a touch detection operation period different from the display operation period; performing touch detection by sampling a detection result of the touch detection element at a timing synchronized with the touch drive signal; detecting noise included in a frequency component sampled in the performing touch detection; and changing a frequency of the touch drive signal to be supplied to the touch detection element in the touch detection operation period, when the noise is detected in the detecting.

According to another aspect, an electronic apparatus includes a display device with a touch detection function. The display device with a touch detection function includes: a plurality of display elements that perform a display operation based on a pixel signal and a display drive signal; a touch detection element that detects an external proximity object in accordance with a touch drive signal; a scan drive unit that supplies the touch drive signal to the touch detection element in a touch detection operation period different from a display operation period in which the pixel signal and the display drive signal are sequentially supplied to the display elements in a time division manner to perform display scanning; a touch detection unit that performs touch detection by sampling a detection result of the touch detection element at a timing synchronized with the touch drive signal; and a noise detector that detects noise included in a frequency component sampled by the touch detection unit. The scan drive unit changes a frequency of the touch drive signal in the touch detection operation period and supplies the changed frequency to the touch detection element, when the noise detector detects the noise.

Additional features and advantages are described herein, and will be apparent from the following Detailed Description and the figures.

BRIEF DESCRIPTION OF THE FIGURES

FIG. 25 is a cross-sectional view of a schematic cross-section structure of a display unit with a touch detection function according to the modification of the embodiments or the like;

DETAILED DESCRIPTION

Exemplary embodiments for implementing the present disclosure will be explained in detail below with reference to the accompanying drawings. The present disclosure is not limited by the contents described in the following embodiments. In addition, the components described as follows include those which can be easily conceived by persons skilled in the art and those which are substantially equivalent thereto. Moreover, the components described as follows can be arbitrarily combined with each other. The explanation is performed in the following order.

Figure 1:
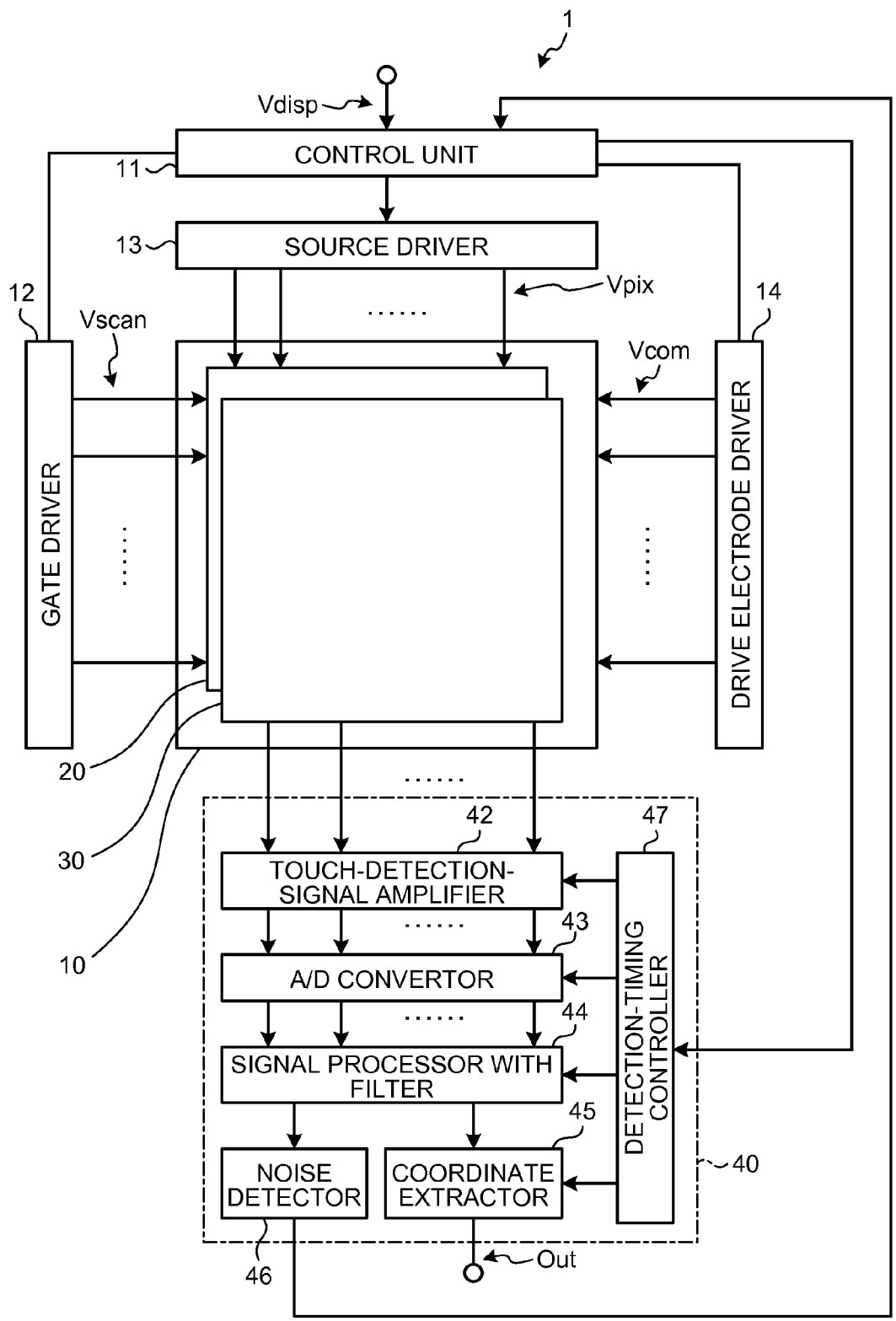
FIG. 1 is a block diagram of a configuration example of a display device with a touch detection function according to a first embodiment.

1. Embodiments (Display Device with Touch Detection Function)
  1-1. First Embodiment
  1-2. Second Embodiment
  1-3. Third Embodiment
  1-4. Other modifications
2. Application Examples (Electronic Apparatuses)
  Examples of applying the display device with a touch detection function according to the embodiments to electronic apparatuses.
3. Aspects of the Present Disclosure
1. Embodiments
1-1. First Embodiment
1-1A. Configuration Example
Entire Configuration Example FIG. 1 is a configuration example of a display device with a touch detection function according to a first embodiment. A display device with a touch detection function 1 includes a display unit with a touch detection function 10, a control unit 11, a gate driver 12, a source driver 13, a drive electrode driver 14, and a touch detection unit 40. The display device with a touch detection function 1 is a display device in which the display unit with a touch detection function 10 has a built-in touch detection function. The display unit with a touch detection function 10 is a so-called in-cell type device in which a liquid-crystal display unit 20 using a liquid crystal element as a display element and a capacitive-type touch detecting device 30 are integrated. The display unit with a touch detection function 10 may be a so-called on-cell type device in which the capacitive-type touch detecting device 30 is mounted on the liquid-crystal display unit 20 that uses a liquid crystal element as a display element.

The liquid-crystal display unit 20 is a device that sequentially scans and displays horizontal lines one by one according to a scan signal Vscan supplied from the gate driver 12, as explained later. The control unit 11 is a circuit that performs the control so as to supply a control signal to the gate driver 12, the source driver 13, the drive electrode driver 14, and the touch detection unit 40 based on a video signal Vdisp supplied from an external device, and so that these units operate in synchronization with one another.

The gate driver 12 has a function of sequentially selecting one horizontal line, being a target to be driven upon display by the display unit with a touch detection function 10, based on the control signal supplied from the control unit 11.

The source driver 13 is a circuit that supplies a pixel signal Vpix to each pixel Pix, explained later, of the display unit with a touch detection function 10 based on the control signal supplied from the control unit 11.

The drive electrode driver 14 is a circuit that supplies a drive signal Vcom to a drive electrode COML, explained later, of the display unit with a touch detection function 10 based on the control signal supplied from the control unit 11.

The touch detection unit 40 is a circuit that detects the presence or absence of a touch (the contact state) performed on the touch detecting device 30 based on the control signal supplied from the control unit 11 and a touch detection signal Vdet supplied from the touch detecting device 30 of the display unit with a touch detection function 10, and calculates coordinates or the like of the touch in a touch detected area when the presence of a touch is detected. The touch detection unit 40 includes a touch-detection-signal amplifier 42, an analog-to-digital (A/D) convertor 43, a signal processor with a filter 44, a coordinate extractor 45, a noise detector 46, and a detection-timing controller 47.

The touch-detection-signal amplifier 42 amplifies the touch detection signal Vdet supplied from the touch detecting device 30. The touch-detection-signal amplifier 42 may include a low-pass analog filter that removes a high frequency component (noise component) contained in the touch detection signal Vdet, extracts a touch component, and outputs the touch component.

Basic Principle of Capacitive-Type Touch Detection

Figure 2:
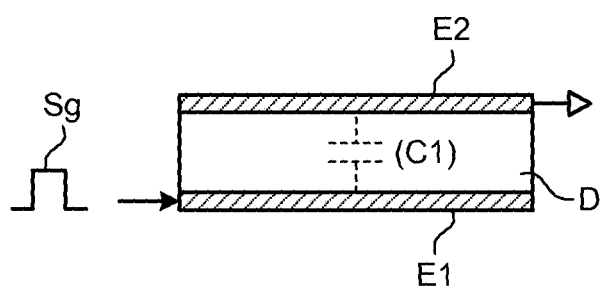
FIG. 2 is an explanatory diagram for explaining a basic principle of a capacitive-type touch detection method and illustrating a finger non-contact or non-proximity state.
Figure 3:
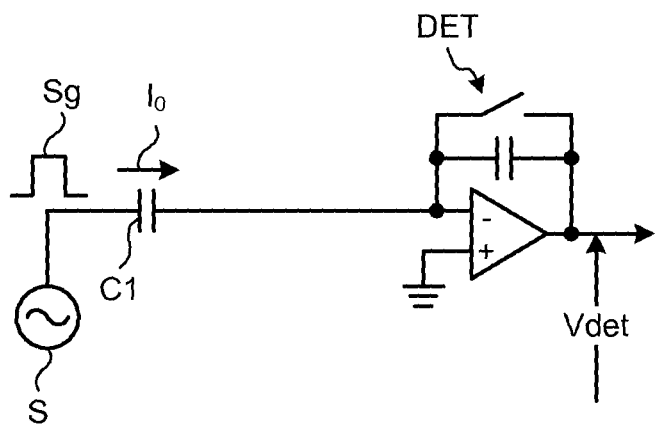
FIG. 3 is an explanatory diagram of an example of an equivalent circuit in the finger non-contact or non-proximity state illustrated in FIG. 2.
Figure 4:
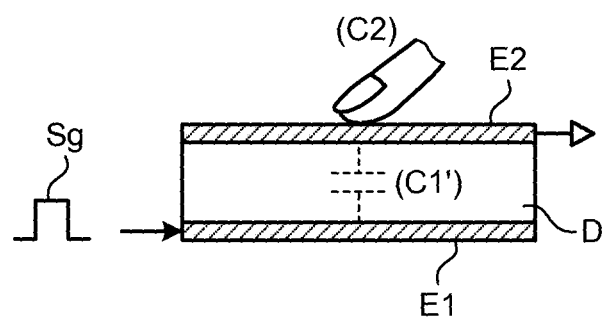
FIG. 4 is an explanatory diagram for explaining the basic principle of the capacitive-type touch detection method and illustrating a finger contact or proximity state.
Figure 5:
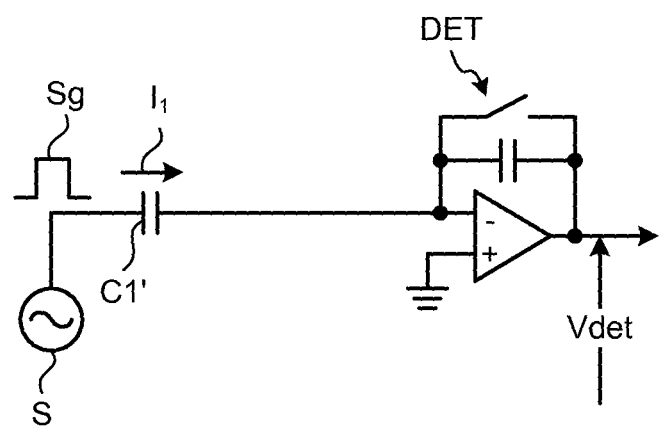
FIG. 5 is an explanatory diagram of an example of the equivalent circuit in the finger contact or proximity state illustrated in FIG. 4.

The touch detecting device 30 operates based on the basic principle of capacitive-type touch detection, and outputs a touch detection signal Vdet. The basic principle of the touch detection in the display device with a touch detection function according to the present embodiment will be explained below with reference to FIG. 1 to FIG. 6. FIG. 2 is an explanatory diagram for explaining the basic principle of a capacitive-type touch detection method and illustrating a finger non-contact or non-proximity state. FIG. 3 is an explanatory diagram of an example of an equivalent circuit in the finger non-contact or non-proximity state illustrated in FIG. 2. FIG. 4 is an explanatory diagram for explaining the basic principle of the capacitive-type touch detection method and illustrating a finger contact or proximity state. FIG. 5 is an explanatory diagram of an example of the equivalent circuit in the finger contact or proximity state illustrated in FIG. 4.

For example, as illustrated in FIG. 2 and FIG. 4, a capacitive element C1 includes a pair of electrodes, a drive electrode E1 and a touch detection electrode E2, which are arranged opposite to each other with a dielectric body D interposed therebetween. As illustrated in FIG. 3, the capacitive element C1 is coupled at one end to an AC signal source (drive signal source) S and is coupled at the other end to a voltage detector (touch detecting unit) DET. The voltage detector DET is an integration circuit included in the touch-detection-signal amplifier 42 illustrated in FIG. 1, for example.

When an AC square wave Sg of a predetermined frequency (e.g., about several kHz to several hundreds of kHz) from the AC signal source S to the drive electrode E1 (one end of the capacitive element C1), an output waveform (touch detection signal Vdet) appears via the voltage detector DET coupled to the touch detection electrode E2 (the other end of the capacitive element C1). The AC square wave Sg corresponds to a touch drive signal Vcomt explained later.

Figure 6:
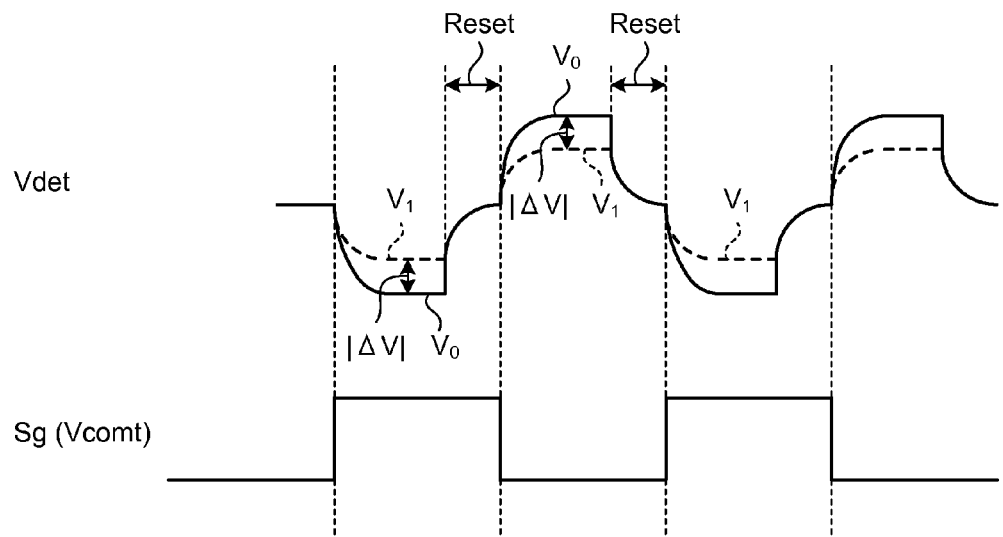
FIG. 6 is a diagram of waveform examples of a drive signal and a touch detection signal.

In a state (non-contact state) in which a finger is not brought into contact with (or proximity to) the device, as illustrated in FIG. 2 and FIG. 3, a current $I_0$ according to a capacitance of the capacitive element C1 flows to the capacitive element C1 in association with charge and discharge. As illustrated in FIG. 6, the voltage detector DET converts a fluctuation of the current $I_0$ according to the AC square wave Sg into a fluctuation of a voltage (waveform $V_0$ indicated by solid line).

Meanwhile, in a state (contact state) in which a finger is brought into contact with (or proximity to) the device, as illustrated in FIG. 4, a capacitance C2 which is formed by the finger is in contact with the touch detection electrode E2 or it is adjacent to the touch detection electrode E2. Therefore, the capacitance corresponding to a fringe between the drive electrode E1 and the touch detection electrode E2 is shielded, and thus the capacitive element C1 acts as a capacitive element C1' with a less capacitance value less. It is understood from the equivalent circuit illustrated in FIG. 5 that a current $I_1$ flows to the capacitive element C1'. As illustrated in FIG. 6, the voltage detector DET converts a fluctuation of the current $I_1$ according to the AC square wave Sg into a fluctuation of a voltage (waveform $V_1$ indicated by dotted line). In this case, the amplitude of the waveform $V_1$ becomes lower as compared with that of the waveform $V_0$. Thereby, an absolute value $|\Delta V|$ of a voltage difference between the waveform $V_0$ and the waveform $V_1$ changes according to the influence of an object such as a finger approaching from the outside. It is preferable that a period Reset in which the charge and discharge of a capacitor is reset by switching in the circuit according to the frequency of the AC square wave Sg be provided in the operation of the voltage detector DET, in order to accurately detect the absolute value $|\Delta V|$ of the voltage difference between the waveform $V_0$ and the waveform $V_1$.

The touch detecting device 30 illustrated in FIG. 1 is configured to sequentially scan detection blocks one by one and perform touch detection according to the drive signal Vcom (touch drive signal Vcomt, explained later) supplied from the drive electrode driver 14.

The touch detecting device 30 is configured to output the touch detection signal Vdet for each detection block from a plurality of touch detection electrodes TDL, explained later, via the voltage detector DET illustrated in FIG. 3 or FIG. 5, and supply the touch detection signal Vdet to the A/D convertor 43 of the touch detection unit 40.

The A/D convertor 43 is a circuit that samples each analog signal output from the touch-detection-signal amplifier 42 at a timing synchronized with the touch drive signal Vcomt and converts the sampled signal into a digital signal.

The signal processor with a filter 44 includes a digital filter that reduces any frequency component (noise component) other than the frequency at which the touch drive signal Vcomt is sampled included in the output signal of the A/D convertor 43. The signal processor with a filter 44 is a logic circuit that detects the presence or absence of a touch performed on the touch detecting device 30 based on the output signal of the A/D convertor 43. The signal processor with a filter 44 performs a process of extracting only a voltage difference caused by the finger. The voltage difference caused by the finger is the absolute value $|\Delta v|$ of the difference between the waveform $V_0$ and the waveform $V_1$. The signal processor with a filter 44 may average absolute values $|\Delta v|$ per one detection block to calculate an average value of the absolute values $|\Delta V|$. The signal processor with a filter 44 can thereby reduce the influence caused by the noise. The signal processor with a filter 44 compares the voltage difference caused by the detected finger with a predetermined threshold voltage, and if the voltage difference is equal to or more than the threshold voltage, then the signal processor with a filter 44 compares the voltage determines that the external proximity object is in the contact state. Meanwhile, if the voltage difference is less than the threshold voltage, then the signal processor with a filter 44 compares the voltage determines that the external proximity object is in the non-contact state. As a result, the touch detection unit 40 is capable of performing touch detection.

The coordinate extractor 45 is a logic circuit that calculates, when the signal processor with a filter 44 detects a touch, touch panel coordinates of the touch. The detection-timing controller 47 performs the control so that the touch-detection-signal amplifier 42, the A/D convertor 43, the signal processor with a filter 44, and the coordinate extractor 45 operate in synchronization with one another. When noise is included in the output signal of the signal processor with a filter 44, the noise detector 46 outputs a noise notification signal of a touch detection signal to the control unit 11.

Display Unit with Touch Detection Function 10

A configuration example of the display unit with a touch detection function 10 will be explained in detail below.

Figure 7:
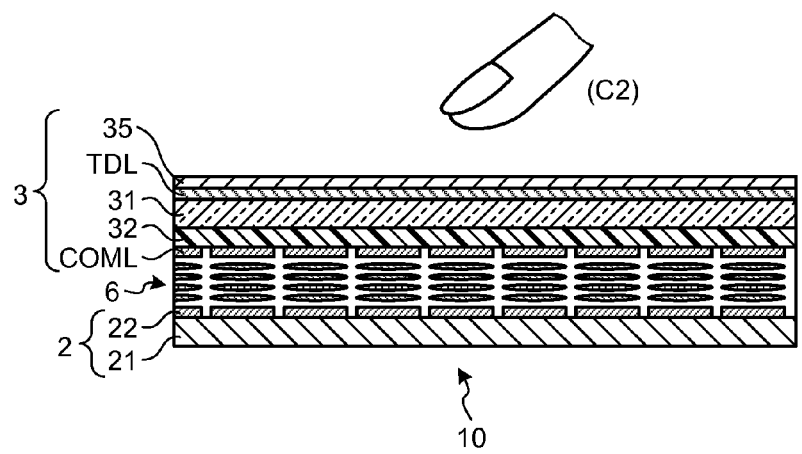
FIG. 7 is a cross-sectional view of a schematic cross-section structure of a display unit with a touch detection function according to the first embodiment.
Figure 8:
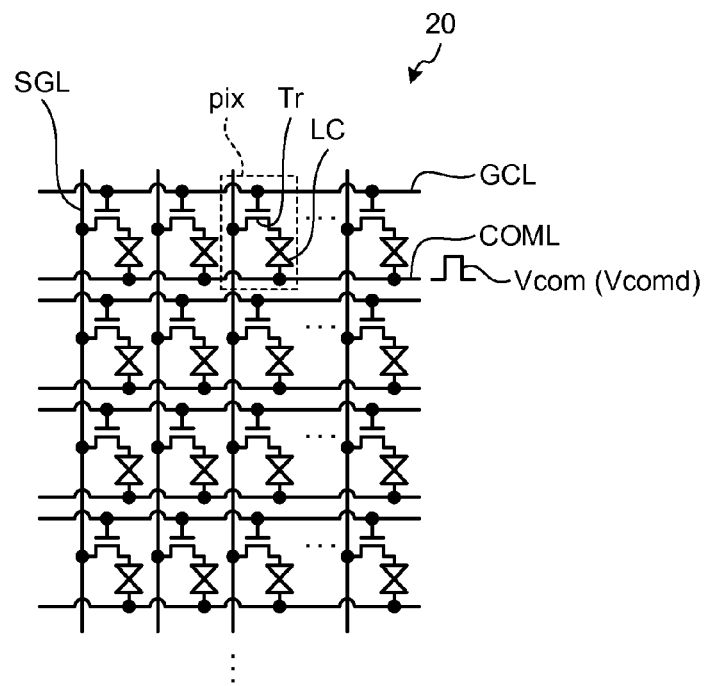
FIG. 8 is a circuit diagram of a pixel array of the display unit with a touch detection function according to the first embodiment.

FIG. 7 is an example of a main-portion cross-section structure of the display unit with a touch detection function 10. FIG. 8 is a circuit diagram of a pixel array of the display unit with a touch detection function according to the first embodiment. The display unit with a touch detection function 10 includes a pixel substrate 2, a counter substrate 3 arranged opposite to the pixel substrate 2, and a liquid crystal layer 6 interposed between the pixel substrate 2 and the counter substrate 3.

The pixel substrate 2 includes a thin film transistor (TFT) substrate 21 as a circuit board, and a plurality of pixel electrodes 22 arranged in a matrix on the TFT substrate 21. Formed on the TFT substrate 21 are, as illustrated in FIG. 8, a TFT element Tr of each pixel Pix and wirings such as a pixel data line SGL for supplying an image signal Vpix to each pixel electrode 22 and a scan data line GCL for driving each TFT element Tr. The liquid-crystal display unit 20 illustrated in FIG. 8 has a plurality of pixels Pix arranged in a matrix. Each pixel Pix includes the TFT element Tr and a liquid crystal element LC. The TFT element Tr is formed with a thin film transistor, and is formed, in this case, with an n-channel metal oxide semiconductor (MOS) type TFT. A source of the TFT element Tr is coupled to the pixel data line SGL, a gate thereof is coupled to the scan data line GCL, and a drain thereof is coupled to one end of the liquid crystal element LC. The liquid crystal element LC is coupled at one end to the drain of the TFT element Tr and is coupled at the other end to the drive electrode COML.

The pixel Pix is mutually coupled to other pixels Pix belonging to the same row of the liquid-crystal display unit 20 through the scan data line GCL. The scan data line GCL is coupled to the gate driver 12 to be supplied with the scan signal Vscan from the gate driver 12. The pixel Pix is mutually coupled to other pixels Pix belonging to the same column of the liquid-crystal display unit 20 through the pixel data line SGL. The pixel data line SGL is coupled to the source driver 13 to be supplied with the pixel signal Vpix from the source driver 13. Moreover, the pixel Pix is mutually coupled to other pixels Pix belonging to the same row of the liquid-crystal display unit 20 through the drive electrode COML. The drive electrode COML is coupled to the drive electrode driver 14 to be supplied with the drive signal Vcom from the drive electrode driver 14. In other words, this example is configured that the pixels Pix belonging to the same row share one drive electrode COML.

The gate driver 12 illustrated in FIG. 1 applies the scan signal Vscan to the gates of the TFT elements Tr of the pixels Pix through the scan data line GCL illustrated in FIG. 8 to thereby sequentially select one row (one horizontal line), as a target to be driven upon display, from among the pixels Pix formed in the matrix in the liquid-crystal display unit 20. The source driver 13 illustrated in FIG. 1 supplies the pixel signal Vpix to each of the pixels Pix forming one horizontal line sequentially selected by the gate driver 12 via the pixel data line SGL illustrated in FIG. 8. The pixels Pix are configured so that one horizontal line is displayed according to the supplied pixel signal Vpix. The drive electrode driver 14 illustrated in FIG. 1 applies a display drive signal Vcomd to drive the drive electrodes COML in a unit of block (drive signal applied block, explained later) that includes a predetermined number of drive electrodes COML illustrated in FIG. 7 and FIG. 8.

As explained above, in the liquid-crystal display unit 20, the gate driver 12 is driven so as to perform line-sequential scanning on the scan data line GCL in a time division manner, and one horizontal line is thereby sequentially selected. Furthermore, in the liquid-crystal display unit 20, the source driver 13 supplies the pixel signal Vpix to the pixels Pix belonging to the one horizontal line, and the display is thereby performed line by line. Upon the display operation, the drive electrode driver 14 is configured to apply the display drive signal Vcomd to the drive signal applied block including the drive electrodes COML corresponding to the one horizontal line.

The counter substrate 3 includes a glass substrate 31, a color filter 32 formed on one face of the glass substrate 31, and the drive electrodes COML formed on the surface of the color filter 32 which is on the opposite side to the glass substrate 31. The touch detection electrodes TDL, which are detection electrodes of the touch detecting device 30, are formed on the other face of the glass substrate 31, and a polarizer 35 is disposed on the touch detection electrodes TDL.

The color filter 32 is such that color filter layers in three colors, for example, red (R), green (G), and blue (B) are periodically arranged and a set of the three colors: R, G, and B is associated with each of the pixels Pix illustrated in FIG. 8.

The drive electrode COML according to the present embodiment functions as a common drive electrode of the liquid-crystal display unit 20 and also functions as a drive electrode of the touch detecting device 30. In the present embodiment, the drive electrode COML are arranged such that one drive electrode COML corresponds to one pixel electrode 22 (pixel electrodes 22 forming one row). The drive electrode COML is configured so that a drive signal Vcom of an AC square waveform (the display drive signal Vcomd and the touch drive signal Vcomt) is applied from the drive electrode driver 14 to the drive electrodes COML via a contact conductive pillar not illustrated) having conductive properties.

The liquid crystal layer 6 is used to modulate light passing therethrough according to the state of an electric field, and the liquid crystal of various modes such as twisted nematic (TN) mode, a vertical alignment (VA) mode, and an electrically controlled birefringence (ECB) mode can be used.

An alignment film may be provided between the liquid crystal layer 6 and the pixel substrate 2 and between the liquid crystal layer 6 and the counter substrate 3, and an incident-side polarizer may be disposed on the bottom side of the pixel substrate 2.

Figure 9:
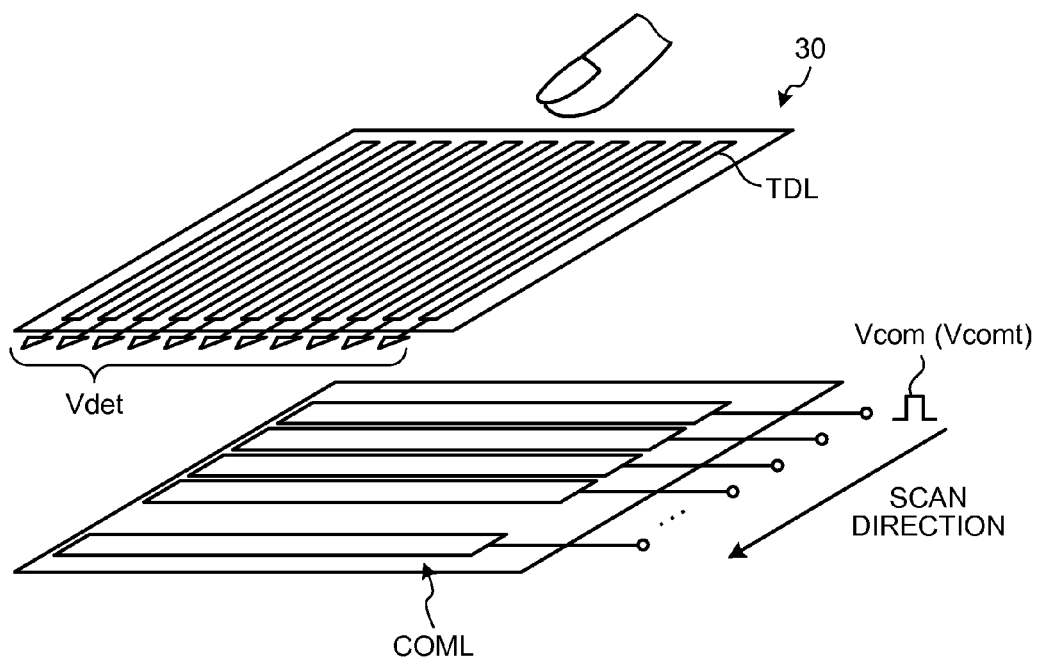
FIG. 9 is a perspective view of a configuration example of drive electrodes and touch detection electrodes of the display unit with a touch detection function according to the first embodiment.

FIG. 9 illustrates a configuration example of the touch detecting device 30 in a perspective manner. The touch detecting device 30 includes the drive electrodes COML and the touch detection electrodes TDL provided on the counter substrate 3. The drive electrodes COML are divided into a plurality of stripe-shaped electrode patterns extending along the horizontal direction in the figure. Upon a touch detection operation, the drive electrode driver 14 sequentially supplies the drive signal Vcom (touch drive signal Vcomt) to one of drive signal applied blocks A1 to Ai, which are explained later, in a scan direction, and thus sequential scan driving is performed to each of the electrode patterns. The touch detection electrodes TDL include stripe-shaped electrode patterns extending along a direction intersecting with an extending direction of the electrode patterns of the drive electrodes COML. Each electrode pattern of the touch detection electrodes TDL is coupled to an input of the touch-detection-signal amplifier 42 of the touch detection unit 40. The electrode patterns of the drive electrode COML and the touch detection electrode TDL intersect one another and form a capacitance at the intersection.

With this configuration, upon the touch detection operation, the touch detecting device 30 sequentially select one drive signal applied block through the line-sequential scanning drive of the drive signal applied blocks performed by the drive electrode driver 14 in a time division manner, and enables touch detection on the one drive signal applied block by outputting the touch detection signal Vdet from the touch detection electrode TDL. In other words, the drive signal applied block corresponds to the drive electrode E1 in the basic principle of the touch detection, the touch detection electrode TDL corresponds to the touch detection electrode E2, and the touch detecting device 30 detects a touch according to the basic principle. As illustrated in FIG. 9, the mutually intersecting electrode pattern is obtained by forming capacitive-type touch sensors in a matrix. Therefore, by scanning over an entire touch detection surface of the touch detecting device 30, it is possible to detect a position where an external proximity object comes in contact with or is in proximity to the touch detection surface.

The liquid crystal element LC corresponds to a specific example of "display element" according to the present disclosure. The gate driver 12 and the drive electrode driver 14 correspond to a specific example of "scan drive unit" according to the present disclosure. The drive electrode COML corresponds to a specific example of "common drive electrode" according to the present disclosure. The touch detecting device 30 corresponds to a specific example of "touch detection element" according to the present disclosure. The touch detection unit 40 corresponds to a specific example of "touch detection unit" according to the present disclosure. The noise detector 46 corresponds to a specific example of "noise detector" according to the present disclosure.

1-1B. Operation and Action

Figure 10:
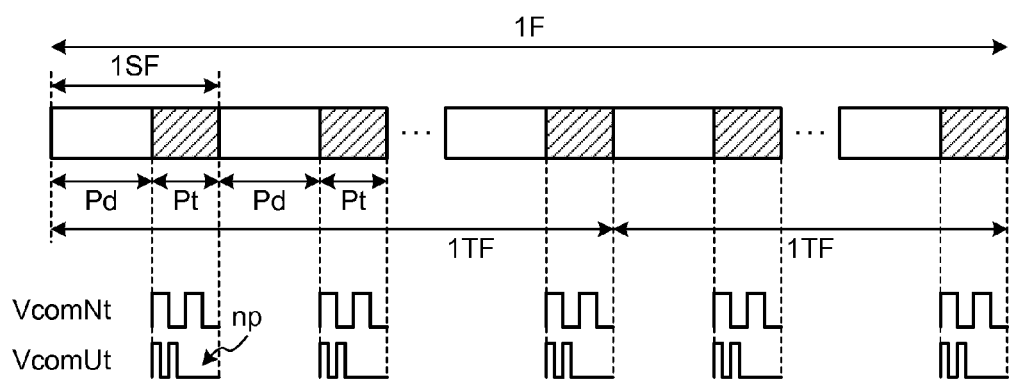
FIG. 10 is a schematic diagram of a relation between a display operation period and a touch detection operation period according to the first embodiment.

An operation and an action of the display device with a touch detection function 1 according to the present embodiment will be explained below. FIG. 10 is a schematic diagram of a relation between a display operation period and a touch detection operation period according to the first embodiment.

The drive electrode COML functions as a common drive electrode of the liquid-crystal display unit 20 and also functions as a drive electrode of the touch detecting device 30, and therefore the drive signals Vcom may possibly affect each other. Because of this, a display operation period Pd for performing a display operation and a touch detection operation period Pt for performing a touch detection operation are separated from each other, and the drive electrode COML is applied with the drive signal Vcom in each of the periods. The drive electrode driver 14 applies the drive signal Vcom as a display drive signal in the display operation period Pd for performing a display operation. The drive electrode driver 14 also applies the drive signal Vcom as a touch drive signal in the touch detection operation period Pt for performing a touch detection operation. In the following explanation, the drive signal Vcom as a display drive signal is described as the display drive signal Vcomd, and the drive signal Vcom as a touch drive signal is described as the touch drive signal Vcomt.

Overview of Entire Operation

The control unit 11 supplies a control signal to the gate driver 12, the source driver 13, the drive electrode driver 14, and the touch detection unit 40 based on the video signal Vdisp supplied from an external device, and controls these units so that these units operate in synchronization with one another. The gate driver 12 supplies the scan signal Vscan to the liquid-crystal display unit 20 in the display operation period Pd, and sequentially selects one horizontal line as a target to be driven upon display. The source driver 13 supplies the pixel signal Vpix to the pixels Pix that form the one horizontal line selected by the gate driver 12 in the display operation period Pd.

The drive electrode driver 14 applies the display drive signal Vcomd to the drive signal applied block related to the one horizontal line in the display operation period Pd, and sequentially applies the touch drive signal Vcomt with a frequency higher than that of the display drive signal Vcomd to the drive signal applied block related to the touch detection operation in the touch detection operation period Pt, thus sequentially selecting one detection block. The display unit with a touch detection function 10 performs a display operation in the display operation period Pd based on the signals supplied from the gate driver 12, the source driver 13, and the drive electrode driver 14. The display unit with a touch detection function 10 performs a touch detection operation in the touch detection operation period Pt based on the signal supplied from the drive electrode driver 14, and outputs the touch detection signal Vdet from the touch detection electrode TDL. The touch-detection-signal amplifier 42 amplifies and outputs the touch detection signal Vdet. The A/D convertor 43 converts the analog signal output from the touch-detection-signal amplifier 42 into a digital signal at a timing synchronized with the touch drive signal Vcomt. The signal processor with a filter 44 detects the presence or absence of a touch performed on the touch detecting device 30 based on the output signal of the A/D convertor 43. When the presence of a touch is detected by the signal processor with a filter 44, the coordinate extractor 45 calculates touch panel coordinates of the touch. The detection-timing controller 47 performs the control so that the touch-detection-signal amplifier 42, the A/D convertor 43, the signal processor with a filter 44, and the coordinate extractor 45 operate in synchronization with one another. When noise is included in the output signal of the signal processor with a filter 44, the noise detector 46 outputs a noise notification signal of a touch detection signal to the control unit 11. The control unit 11 controls the detection-timing controller 47 to change the sampling frequency of the touch drive signal Vcomt.

Detailed Operation

A detailed operation of the display device with a touch detection function 1 will be explained below. As illustrated in FIG. 10, one frame period 1F is a time period required for selecting all horizontal lines on a display surface of the liquid-crystal display unit 20 being a target to be driven upon display. One touch report period 1TF is a time period required for sequentially selecting all drive signal applied block on the touch detection surface of the touch detecting device 30. As illustrated in FIG. 10, one frame period 1F includes two sections of the one touch report period 1TF. For example, when the frame period 1F is set at a cycle of 60 Hz, the one touch report period 1TF is set at a cycle of 120 Hz.

A standard period 1SF includes a display operation period Pd with a predetermined length and a touch detection operation period Pt with a predetermined length. In other words, the touch detection operation period Pt is provided in a period with no display operation. Therefore, in the touch detection operation period Pt in which a touch detection operation is performed, various signals for performing display operation (the scan signal Vscan and the pixel signal Vpix) are not applied to the liquid-crystal display unit 20. Therefore, in the touch detection operation period Pt, the scan data line GCL and the pixel data line SGL are set in a floating state or in a state in which a direct current potential is applied. This enables reduction in the possibility of noise transmission from the scan data line GCL and the pixel data line SGL to the touch detection electrode TDL via a parasitic capacitance. In other words, the display device with a touch detection function 1 is capable of reducing internal-noise-caused influence on the touch detection operation.

Figure 11:
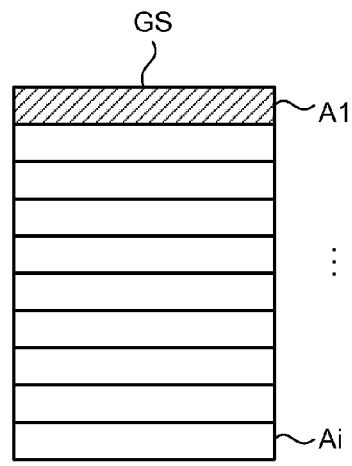
FIG. 11 is a schematic diagram of an operation example of a drive electrode driver according to the first embodiment.
Figure 12:
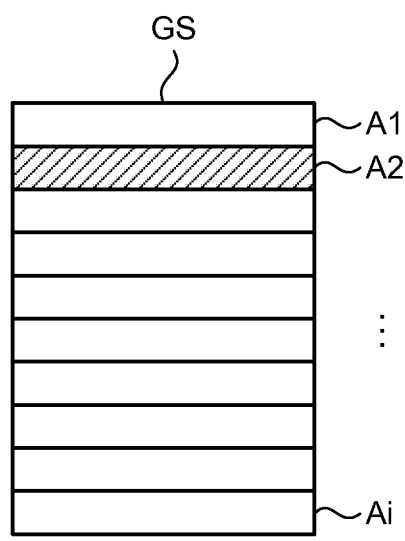
FIG. 12 is a schematic diagram of an operation example of the drive electrode driver according to the first embodiment.
Figure 13:
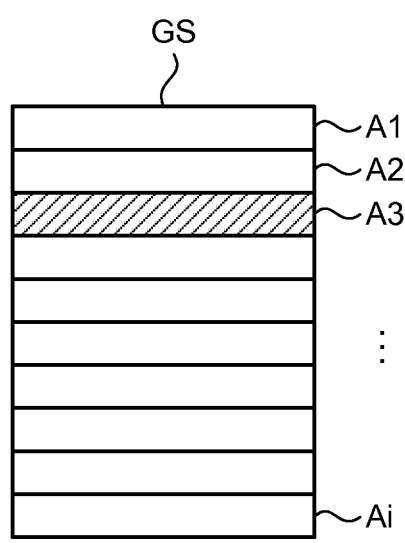
FIG. 13 is a schematic diagram of an operation example of the drive electrode driver according to the first embodiment.

FIG. 11, FIG. 12, and FIG. 13 are schematic diagrams of an operation example of the drive electrode driver 14. A screen GS of the display unit with a touch detection function 10 illustrated in FIG. 11 is divided into, for example, 10 drive signal applied blocks from the drive signal applied block A1 to a drive signal applied block Ai. For example, in the touch detection operation period Pt of the standard period 1SF, the drive electrode driver 14 simultaneously applies the touch drive signal Vcomt to a predetermined number of drive electrodes COML corresponding to the drive signal applied block A1. As illustrated in FIG. 12, in the touch detection operation period Pt of the next standard period 1SF, the drive electrode driver 14 simultaneously applies the touch drive signal Vcomt to a predetermined number of drive electrodes COML corresponding to the drive signal applied block A2. Then, as illustrated in FIG. 13, in a touch detection operation period Pt of the next standard period 1SF, the drive electrode driver 14 simultaneously applies the touch drive signal Vcomt to a predetermined number of drive electrodes COML corresponding to the drive signal applied block A3. In this way, the drive electrode driver 14 simultaneously applies the touch drive signal Vcomt to the predetermined number of drive electrodes COML and sequentially applies the touch drive signal Vcomt from the drive signal applied block A1 to the drive signal applied block Ai to thereby perform touch detection scanning.

A waveform VcomUt and a waveform VcomNt of the touch drive signal Vcomt represent examples of a waveform in the touch detection operation period Pt. The waveform VcomUt and the waveform VcomNt illustrated in FIG. 10 have the same two pulses of the touch drive signal Vcomt in the touch detection operation period Pt. The waveform VcomUt has a frequency set higher than that of the waveform VcomNt and has therefore a non-signal time period np with no pulse.

Figure 14:
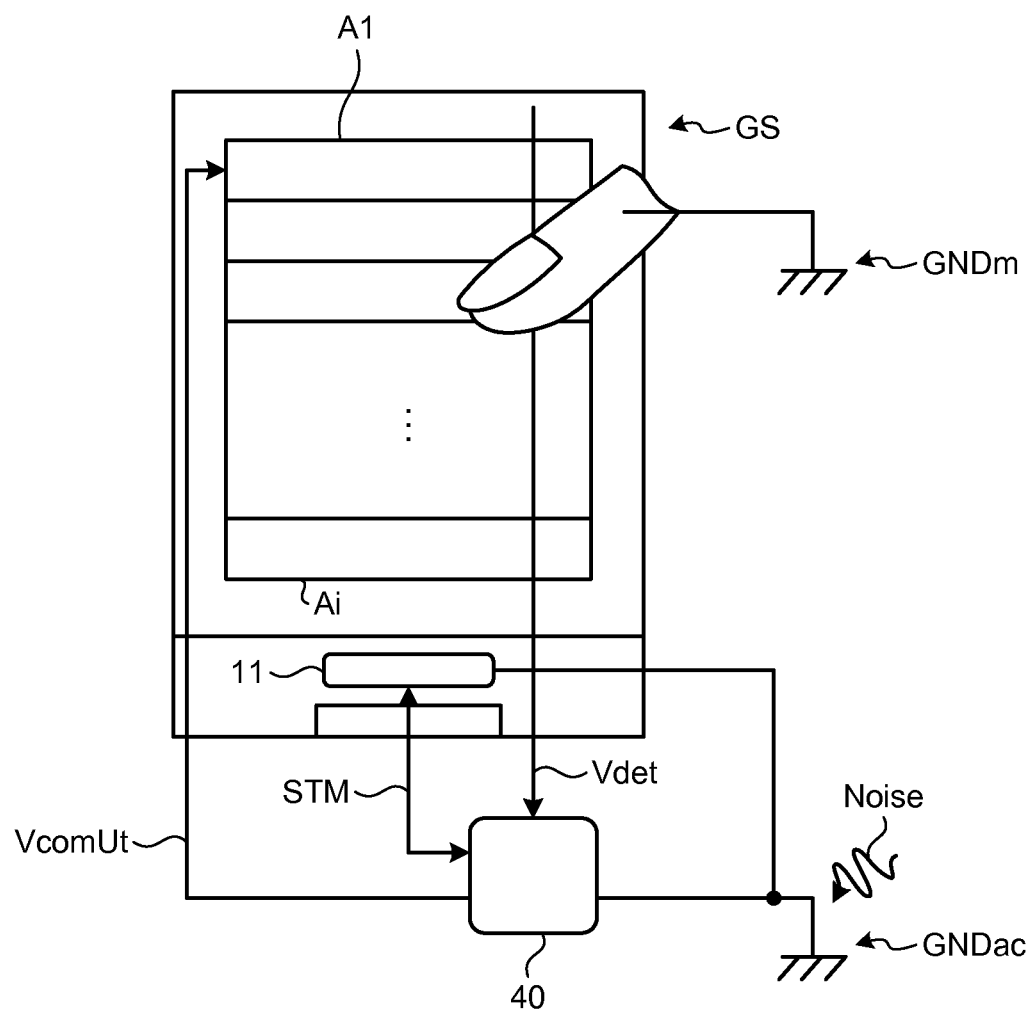
FIG. 14 is an explanatory diagram for explaining external noise.

FIG. 14 is an explanatory diagram for explaining external noise. When the touch detection unit 40 is coupled to the AC power supply, external noise (noise) due to the AC power supply or so may possibly be propagated to the touch drive signal Vcomt entirely, caused by a difference between a ground potential GNDm of human body and a signal ground potential GNDac of the AC power supply. In the touch detection unit 40, the signal processor with a filter 44 includes a digital filter that removes a frequency component (noise component) higher than the frequency at which the touch drive signal Vcomt is sampled, that is, external noise (noise) included in the output signal of the A/D convertor 43, and thereby extracts a touch component. The digital filter needs to extract the touch component from the frequency component at which the touch drive signal Vcomt is sampled. Therefore, if the frequency of the external noise and the frequency at which the touch drive signal Vcomt is sampled are close to each other, an effect to reduce the external noise may decrease.

Figure 15:
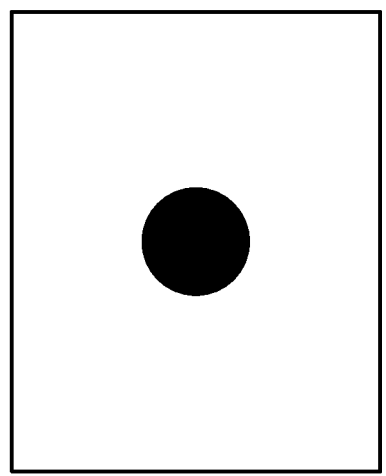
FIG. 15 is an explanatory diagram for explaining an object detection pattern example of the display device with a touch detection function.
Figure 16:
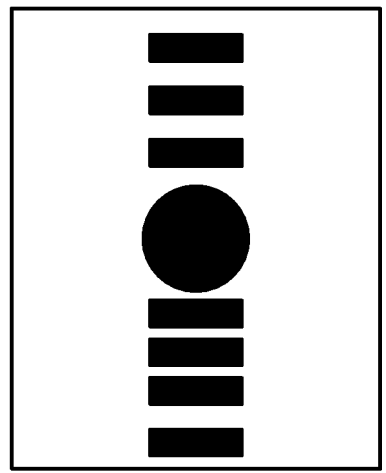
FIG. 16 is an explanatory diagram for explaining a noise detection pattern of the display device with a touch detection function.

FIG. 15 is an explanatory diagram for explaining an object detection pattern example of the display device with a touch detection function. FIG. 16 is an explanatory diagram for explaining a noise detection pattern of the display device with a touch detection function. As illustrated in FIG. 9, the mutually intersecting electrode patterns form capacitive-type touch sensors in a matrix. Therefore, by scanning over the entire touch detection surface of the touch detecting device 30, a position where the external proximity object comes in contact with or is in proximity to the touch detection surface can be recognized as an object detection pattern, as illustrated in FIG. 15, in which noise influence is reduced. However, when the frequency of the external noise and the frequency at which the touch drive signal Vcomt is sampled are close to each other, a specific noise detection pattern as illustrated in FIG. 16 may be recognized around the position where the external proximity object comes in contact with or is in proximity to the touch detection surface.

The noise detector 46 previously stores therein the object detection pattern and the noise detection pattern as illustrated in FIG. 15 and FIG. 16 respectively, and compares a stored pattern with an output signal of the signal processor with a filter 44. When the noise detection pattern illustrated in FIG. 16 is recognized and the noise is included in the output signal of the signal processor with a filter 44, the noise detector 46 outputs a noise notification signal of the touch detection signal to the control unit 11. Subsequently, the control unit 11 outputs a timing control signal STM to the touch detection unit 40, and controls the detection-timing controller 47 to change the sampling frequency of the touch drive signal Vcomt. For example, the control unit 11 changes the waveform VcomUt of the touch drive signal Vcomt to the waveform VcomNt. The control unit 11 may change the waveform VcomNt of the touch drive signal Vcomt to the waveform VcomUt. The noise detector 46 is configured to output a noise notification signal of the touch detection signal to the control unit 11 when the noise detection pattern illustrated in FIG. 16 is recognized and the noise is included in the output signal of the signal processor with a filter 44. However, the embodiment is not limited thereto. The noise detector 46 may output a noise notification signal, which indicates that the noise is included in the output signal of the signal processor with a filter 44, to the control unit 11 when detecting a noise component that exceeds a preset threshold of a noise component.

1-1C. Effect

As explained above, in the first embodiment, when the noise detector 46 detects the noise, the drive electrode driver 14 changes the frequency of the touch drive signal Vcomt of the waveform VcomUt in the touch detection operation period Pt and supplies the touch drive signal Vcomt of the waveform VcomNt to the touch detecting device 30. In other words, if the frequency of the external noise and the frequency at which the touch drive signal Vcomt is sampled are close to each other, the drive electrode driver 14 performs the touch detection operation and changes the sampling frequency of the touch drive signal Vcomt in the touch detection operation period Pt. Thereby, the frequency of the external noise and the frequency at which the touch drive signal Vcomt is sampled can be made different from each other, so that the signal processor with a filter 44 can remove the noise component included in the output signal of the A/D convertor 43 and extract a high-precision touch component.

The display device with a touch detection function 1 according to the first embodiment is driven by the waveform VcomUt, for sampling the touch drive signal Vcomt, which includes the non-signal time period np with no pulse in the touch detection operation period Pt in order to perform the touch detection operation in the touch detection operation period Pt different from the display operation period Pd.

1-2. Second Embodiment

Figure 17:
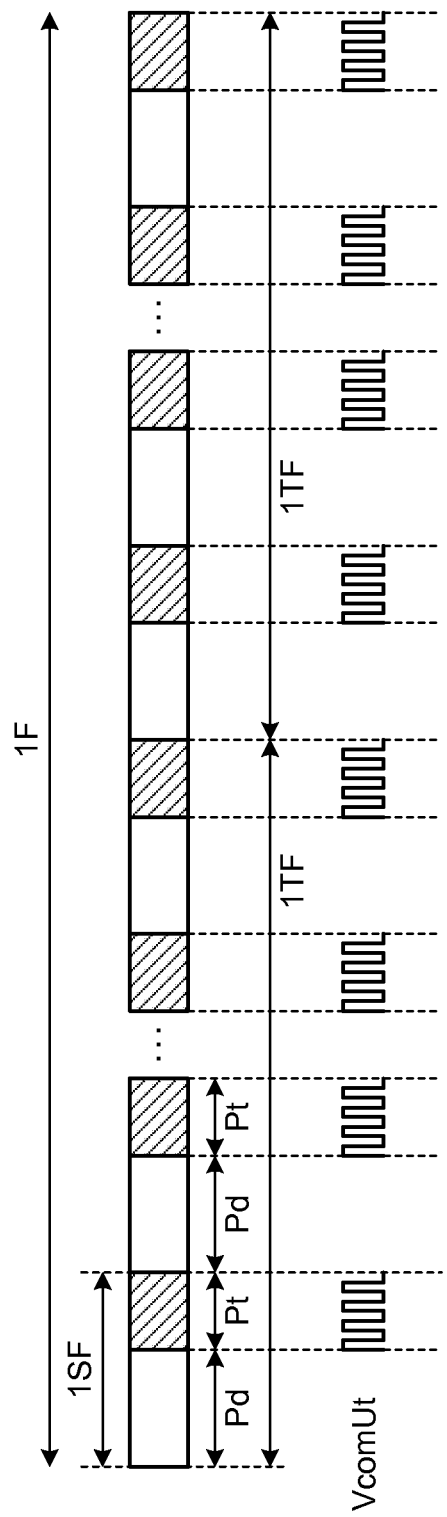
FIG. 17 is a schematic diagram of a relation between a display operation period and a touch detection operation period according to a second embodiment.
Figure 18:
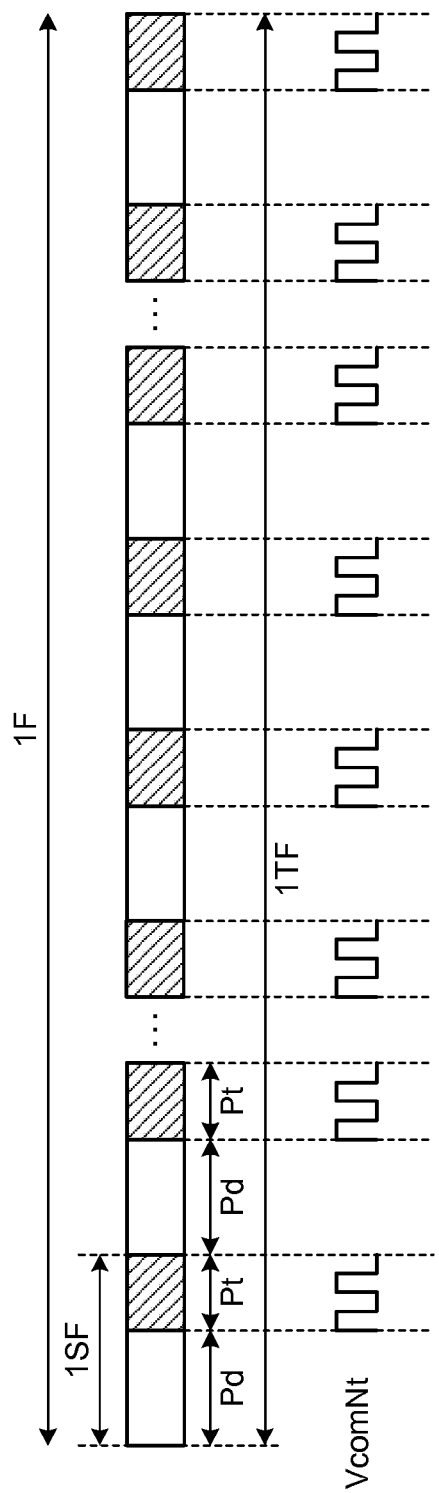
FIG. 18 is a schematic diagram of a relation between the display operation period and the touch detection operation period according to the second embodiment.

A display device with a touch detection function 1 according to a second embodiment will be explained below. FIG. 17 and FIG. 18 are schematic diagrams of a relation between a display operation period and a touch detection operation period according to the second embodiment. The same letters or numerals are assigned to components the same as the components explained in the first embodiment, and overlapping explanation thereof may not be repeated.

As illustrated in FIG. 10, the display device with a touch detection function 1 according to the first embodiment needs to provide a touch detection operation period Pt, in which a touch detection operation can be performed at even a slowest sampling frequency among sampling frequencies of the touch drive signal Vcomt, in each standard period. Therefore, in the display device with a touch detection function 1 according to the first embodiment, each required time for one touch report period 1TF and one frame period 1F is extended, which causes some restrictions on high resolution or upsizing of the screen GS of the display unit with a touch detection function 10.

As illustrated in FIG. 17, the frame period 1F includes two sections of the one touch report period 1TF. For example, when the frame period 1F is set at a cycle of 60 Hz, the one touch report period 1TF is set at a cycle of 120 Hz. The waveform VcomUt illustrated in FIG. 17 has four pulses of the touch drive signal Vcomt in the touch detection operation period Pt. As explained above, the noise detector 46 previously stores therein the object detection pattern and the noise detection pattern as illustrated in FIG. 15 and FIG. 16 respectively, and compares a stored pattern with an output signal of the signal processor with a filter 44. When the noise detection pattern illustrated in FIG. 16 is recognized and the noise is included in the output signal of the signal processor with a filter 44, the noise detector 46 outputs a noise notification signal of the touch detection signal to the control unit 11.

The control unit 11 controls the detection-timing controller 47 so that the frame period 1F includes one section of the one touch report period 1TF. This allows the one touch report period 1TF illustrated in FIG. 18 to include the touch detection operation periods Pt twice as many as compared with the one touch report period 1TF illustrated in FIG. 17. For example, when the frame period 1F is set at a cycle of 60 Hz, in the one touch report period 1TF, the cycle is changed from 120 Hz to 60 Hz. The control unit 11 then controls the detection-timing controller 47 to change the sampling frequency of the touch drive signal Vcomt. For example, the control unit 11 changes the waveform VcomUt of the touch drive signal Vcomt to the waveform VcomNt. As a result, the sampling frequency of the waveform VcomUt of the touch drive signal Vcomt can be made twice as high as the sampling frequency of the waveform VcomNt. The waveform VcomNt illustrated in FIG. 18 has two pulses of the touch drive signal Vcomt in the touch detection operation period Pt, and can therefore have four pulses of the touch drive signal Vcomt in two touch detection operation periods Pt. Thereby, the frequency of the external noise and the frequency at which the touch drive signal Vcomt is sampled can be made different from each other, so that the signal processor with a filter 44 can remove the noise component included in the output signal of the A/D convertor 43 and the coordinate extractor 45 can extract a high-precision touch component.

1-2A. Modification of Second Embodiment

Figure 19:
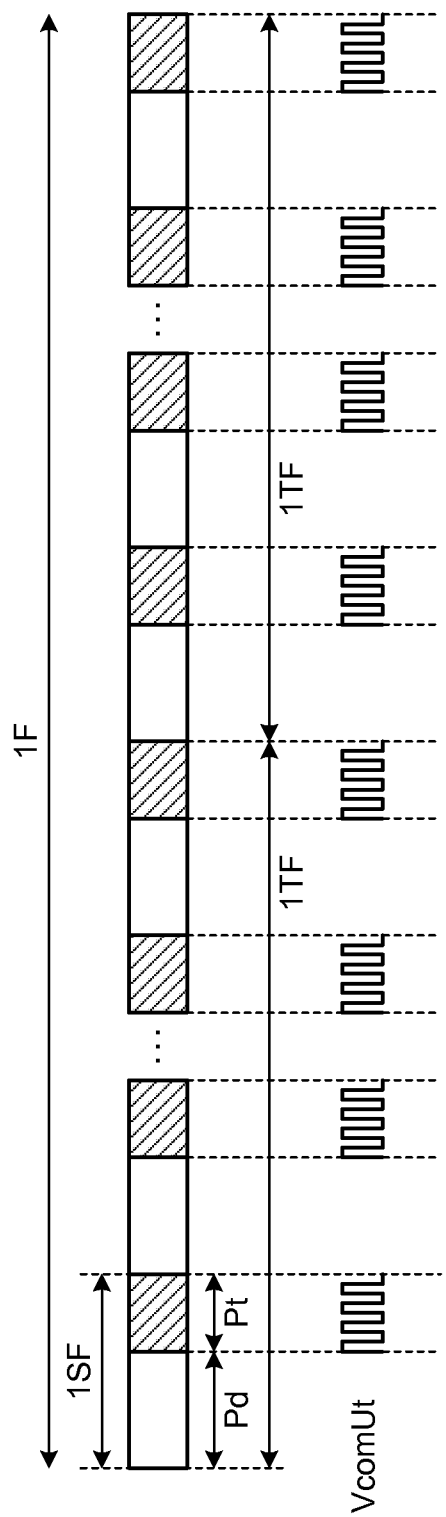
FIG. 19 is a schematic diagram of a relation between the display operation period and the touch detection operation period according to a modification of the second embodiment.
Figure 20:
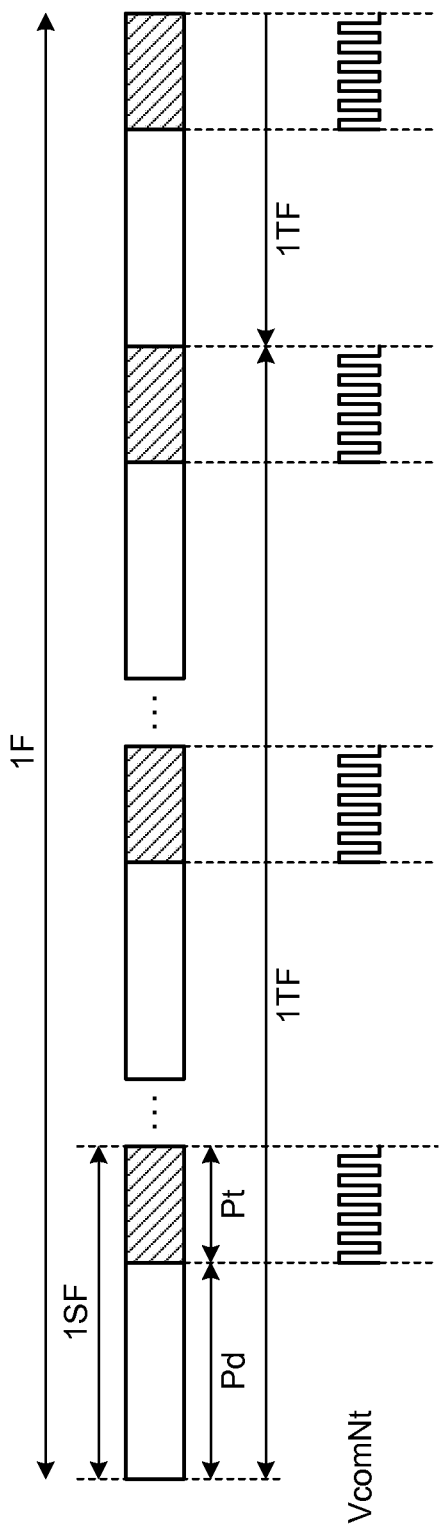
FIG. 20 is a schematic diagram of a relation between the display operation period and the touch detection operation period according to the modification of the second embodiment.

FIG. 19 and FIG. 20 are schematic diagrams of a relation between the display operation period and the touch detection operation period according to a modification of the second embodiment. In the second embodiment, the control unit 11 controls the detection-timing controller 47 so that the frame period 1F includes one section of the one touch report period 1TF. In a modification of the second embodiment, the control unit 11 controls the detection-timing controller 47 so that the frame period 1F includes one and a half section of the one touch report period 1TF.

As illustrated in FIG. 19, the frame period 1F includes two sections of the one touch report period 1TF. For example, when the frame period 1F is set at a cycle of 60 Hz, the one touch report period 1TF is set at a cycle of 120 Hz. As explained above, the noise detector 46 previously stores therein the object detection pattern and the noise detection pattern as illustrated in FIG. 15 and FIG. 16 respectively, and compares a stored pattern with an output signal of the signal processor with a filter 44. When the noise detection pattern illustrated in FIG. 16 is recognized and the noise is included in the output signal of the signal processor with a filter 44, the noise detector 46 outputs a noise notification signal of the touch detection signal to the control unit 11.

The control unit 11 controls the detection-timing controller 47 so that the frame period 1F includes one and a half section of the one touch report period 1TF. This allows the one touch report period 1TF illustrated in FIG. 20 to include the touch detection operation period Pt one and a half times as long as compared with the one touch report period 1TF illustrated in FIG. 19. For example, when the frame period 1F is set at a cycle of 60 Hz, in the one touch report period 1TF, the cycle is changed from 120 Hz to 90 Hz. The control unit 11 then controls the detection-timing controller 47 to change the sampling frequency of the touch drive signal Vcomt. For example, the control unit 11 changes the waveform VcomUt of the touch drive signal Vcomt to the waveform VcomNt. As a result, the sampling frequency of the waveform VcomUt of the touch drive signal Vcomt can be made one and a half times as high as the sampling frequency of the waveform VcomNt. Thereby, the frequency of the external noise and the frequency at which the touch drive signal Vcomt is sampled can be made different from each other, so that the signal processor with a filter 44 can remove the noise component included in the output signal of the A/D convertor 43 and the coordinate extractor 45 can extract a high-precision touch component.

1-2B. Effect

As explained above, in the second embodiment and the modification, when the noise detector 46 detects the noise, the drive electrode driver 14 changes a ratio of the one touch report period 1TF, in which a touch detection is performed for one screen, to the one frame period 1F in which the display scanning is performed for one screen. This causes the total time of the touch detection operation period Pt included in the one touch report period 1TF to increase or decrease. The drive electrode driver 14 then changes the sampling frequency to a sampling frequency of the touch drive signal Vcomt that falls within the touch detection operation period Pt. Thereby, the frequency of the external noise and the frequency at which the touch drive signal Vcomt is sampled can be made different from each other, so that the signal processor with a filter 44 can remove the noise component included in the output signal of the A/D convertor 43, thus extracting a high-precision touch component.

The display device with a touch detection function 1 according to the second embodiment and the modification does not require the non-signal time period np in which the time required for one touch report period 1TF and one frame period 1F is extended, and can secure an increase/decrease time of the touch detection operation period Pt. Therefore, the display device with a touch detection function 1 according to the second embodiment and the modification enables high resolution or upsizing of the screen GS of the display unit with a touch detection function 10.

1-3. Third Embodiment

Figure 21:
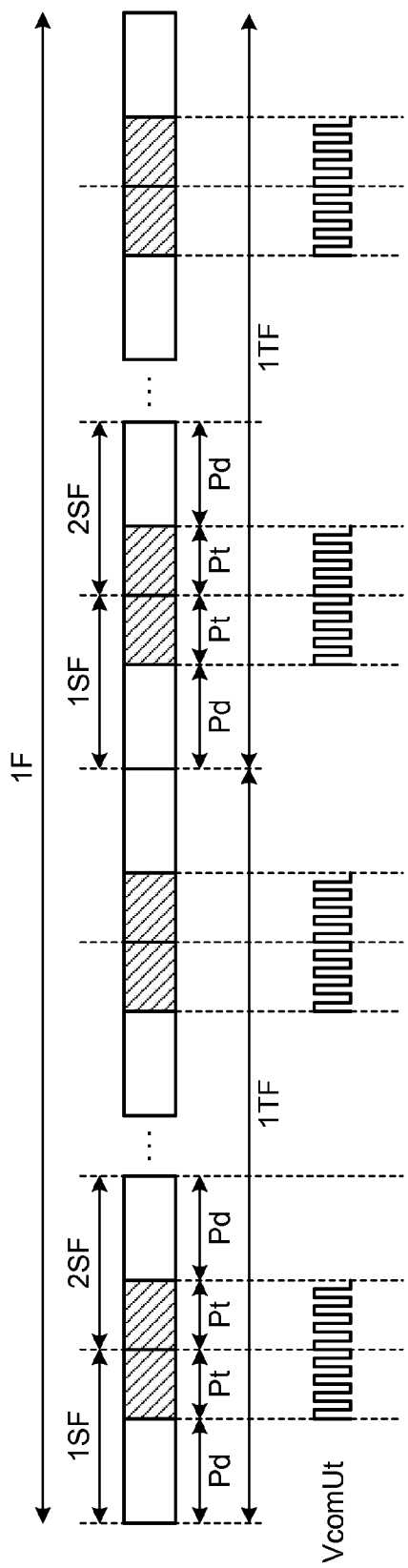
FIG. 21 is a schematic diagram of a relation between a display operation period and a touch detection operation period according to a third embodiment.
Figure 22:
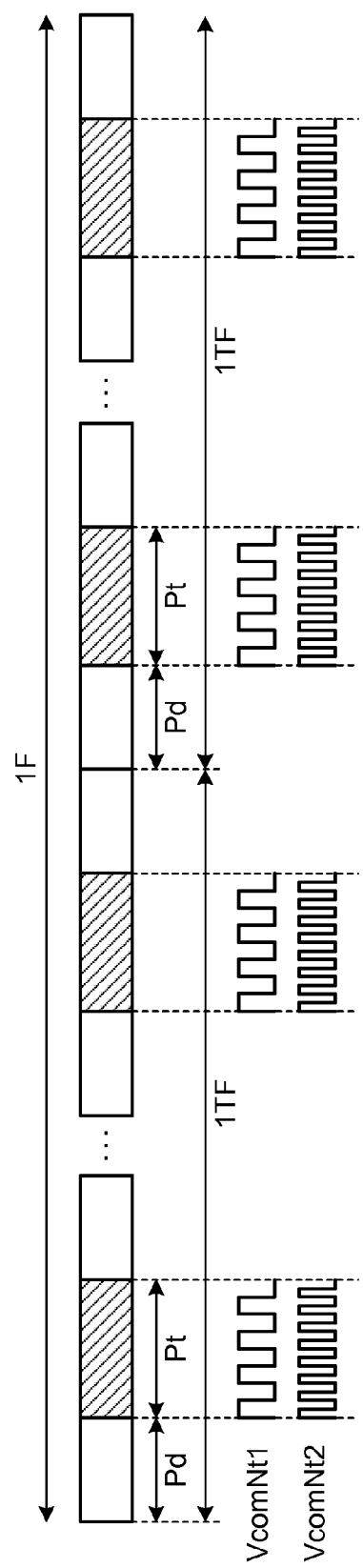
FIG. 22 is a schematic diagram of a relation between the display operation period and the touch detection operation period according to the third embodiment.

A display device with a touch detection function 1 according to a third embodiment will be explained below. FIG. 21 and FIG. 22 are schematic diagrams of a relation between a display operation period and a touch detection operation period according to the third embodiment. The same letters or numerals are assigned to components the same as the components explained in the first embodiment and the second embodiment, and overlapping explanation thereof may not be repeated.

As illustrated in FIG. 21 and FIG. 22, the display device with a touch detection function 1 according to the third embodiment successively sets two types of the standard period 1SF and a standard period 2SF. Set in the standard period 1SF are the display operation period Pd with a predetermined length and the touch detection operation period Pt with a predetermined length in this order. Set in the standard period 2SF are the touch detection operation period Pt with a predetermined length and the display operation period Pd with a predetermined length in this order. The execution order between the display operation period Pd and the touch detection operation period Pt are reversed in the standard period 1SF and the standard period 2SF. Therefore, when the standard period 1SF and the standard period 2SF are executed, two touch detection operation periods Pt are successively executed.

As illustrated in FIG. 21, the frame period 1F includes two sections of the one touch report period 1TF. For example, when the frame period 1F is set at a cycle of 60 Hz, the one touch report period 1TF is set at a cycle of 120 Hz. The waveform VcomUt illustrated in FIG. 21 has four pulses of the touch drive signal Vcomt in the touch detection operation period Pt. The noise detector 46 previously stores therein the object detection pattern and the noise detection pattern as illustrated in FIG. 15 and FIG. 16 respectively, and compares a stored pattern with an output signal of the signal processor with a filter 44. When the noise detection pattern illustrated in FIG. 16 is recognized and the noise is included in the output signal of the signal processor with a filter 44, the noise detector 46 outputs a noise notification signal of the touch detection signal to the control unit 11.

The control unit 11 controls the detection-timing controller 47 so that the frame period 1F includes one section of the one touch report period 1TF. In this way, the control unit 11 changes a ratio of the one touch report period 1TF to the frame period 1F. For example, when the frame period 1F is set at a cycle of 60 Hz, in the one touch report period 1TF, the cycle is changed from 120 Hz to 60 Hz. This allows the one touch report period 1TF illustrated in FIG. 22 to include the touch detection operation periods Pt twice as long as compared with the one touch report period 1TF illustrated in FIG. 21. The control unit 11 then controls the detection-timing controller 47 to change the sampling frequency of the touch drive signal Vcomt. For example, the control unit 11 changes the waveform VcomUt of the touch drive signal Vcomt to a waveform VcomNt1. As a result, the sampling frequency of the waveform VcomUt of the touch drive signal Vcomt can be made twice as high as the sampling frequency of the waveform VcomNt. The waveform VcomNt1 illustrated in FIG. 22 has four pulses of the touch drive signal Vcomt in the doubled touch detection operation period Pt. Thereby, the frequency of the external noise and the frequency at which the touch drive signal Vcomt is sampled can be made different from each other, so that the signal processor with a filter 44 can remove the noise component included in the output signal of the A/D convertor 43, thus extracting a high-precision touch component.

Alternatively, the control unit 11 controls the detection-timing controller 47 to change the sampling frequency of the touch drive signal Vcomt. For example, the control unit 11 changes the waveform VcomUt of the touch drive signal Vcomt to a waveform VcomNt2. The waveform VcomNt2 illustrated in FIG. 22 has eight pulses of the touch drive signal Vcomt in the doubled touch detection operation period Pt. Thereby, the frequency of the external noise and the frequency at which the touch drive signal Vcomt is sampled can be made different from each other, so that the signal processor with a filter 44 can remove the noise component included in the output signal of the A/D convertor 43, thus extracting a high-precision touch component.

1-3A. Evaluation Example of Third Embodiment

Figure 23:
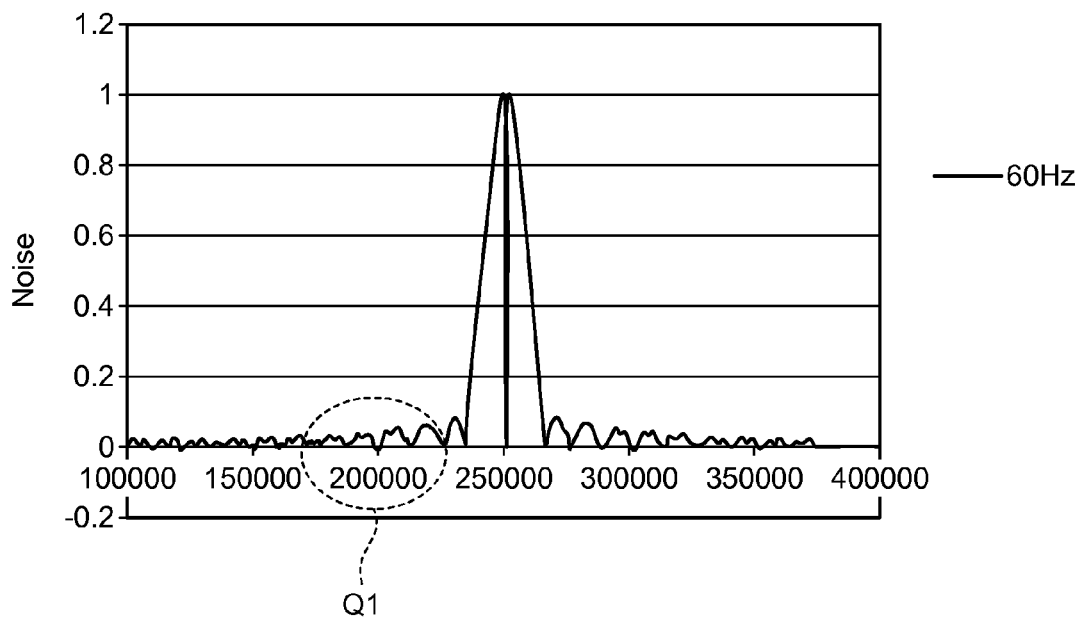
FIG. 23 is an evaluation example of a display device with a touch detection function according to the third embodiment.
Figure 24:
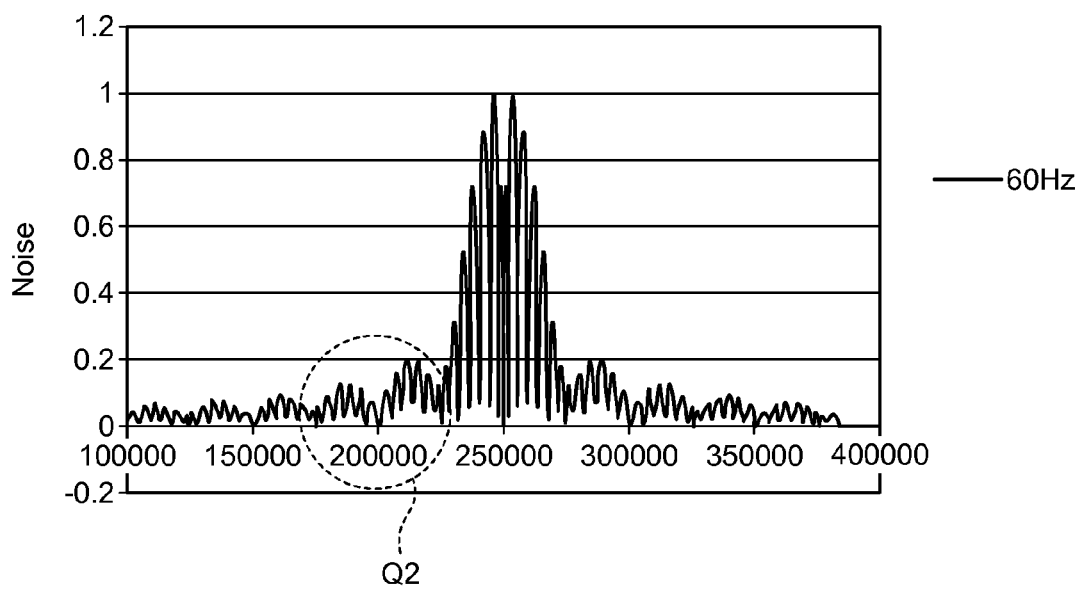
FIG. 24 is an evaluation example of a display device with a touch detection function according to the second embodiment.

FIG. 23 is an evaluation example of the display device with a touch detection function according to the third embodiment. FIG. 24 is an evaluation example of the display device with a touch detection function according to the second embodiment. FIG. 23 and FIG. 24 represent the characteristic of the filter in the signal processor with a filter 44, in which a noise frequency is plotted on an x-axis and a standardized strength of influence on the touch drive signal Vcomt when external noise is included is plotted on a y-axis. As illustrated in FIG. 23 and FIG. 24, for example, when external noise caused by an AC power supply of 250 MHz or so is entered, it is represented that the display device with a touch detection function according to the second embodiment and the third embodiment may cause the external noise to pass through the signal processor with a filter 44 as it is without removing the external noise by using the filters.

In the display device with a touch detection function according to the second embodiment and the third embodiment, when the noise detector 46 detects the external noise caused by an AC power supply of 250 MHz or so, the control unit 11 controls the detection-timing controller 47 to change the sampling frequency of the touch drive signal Vcomt. As a result, the characteristic of the filter in the signal processor with a filter 44 horizontally moves parallel to the X-axis direction without any change in distributions illustrated in FIG. 23 and FIG. 24. Therefore, the characteristic of the filter in the signal processor with a filter 44 becomes such that the influence of the external noise caused by an AC power supply of 250 MHz or so is reduced, and the display device with a touch detection function according to the second embodiment and the third embodiment can perform touch detection with the influence of the noise reduced.

As explained above, in the display device with a touch detection function 1 according to the third embodiment, when the standard period 1SF and the standard period 2SF are executed, then two touch detection operation periods Pt are successively executed. Thereby, even if the waveform VcomUt of the touch drive signal Vcomt is changed to the waveform VcomNt, the control unit 11 can execute the touch detection operations per a drive signal applied block Ai without spreading over the display operation period Pd.

The drive electrode COML according to the third embodiment functions as a common drive electrode of the liquid-crystal display unit 20 and also functions as a drive electrode of the touch detecting device 30. Because the touch detection operation per drive signal applied block Ai can be executed without spreading over the display operation period Pd, the display device with a touch detection function 1 according to the third embodiment can suppress the influence of the display drive signal Vcomd applied to the drive electrode COML. On the other hand, the display device with a touch detection function 1 according to the second embodiment executes the touch detection operation per drive signal applied block Ai spreading over the display operation period Pd. In the display device with a touch detection function 1 according to the second embodiment, the sampling processes per one drive signal applied block Ai are separated as compared with these of the display device with a touch detection function 1 according to the third embodiment. For example, the strength of the influence on the touch drive signal Vcomt when the external noise is included is high around Q2 in FIG. 24 as compared with around Q1 in FIG. 23. In this way, the display device with a touch detection function 1 according to the second embodiment has a wide range of frequency easily affected by the external noise as compared with that of the display device with a touch detection function 1 according to the third embodiment. Therefore, the display device with a touch detection function 1 according to the third embodiment can reduce the influence of the display drive signal Vcomd more than that of the display device with a touch detection function 1 according to the second embodiment, thus improving noise resistance characteristics.

1-3B. Effect

As explained above, in the third embodiment, when the noise detector 46 detects the noise, the drive electrode driver 14 changes a ratio of the one touch report period 1TF, in which a touch detection is performed for one screen, to the one frame period 1F in which the display scanning is performed for one screen. This enables the total time of the touch detection operation period Pt included in the one touch report period 1TF to increase or decrease. The drive electrode driver 14 then changes the sampling frequency to a sampling frequency of the touch drive signal Vcomt that falls within the touch detection operation period Pt. Thereby, the frequency of the external noise and the frequency at which the touch drive signal Vcomt is sampled can be made different from each other, so that the signal processor with a filter 44 can remove the noise component included in the output signal of the A/D convertor 43, thus extracting a high-precision touch component.

The display device with a touch detection function 1 according to the third embodiment does not require the non-signal time period np used to extend each required time for one touch report period 1TF and one frame period 1F, and can secure an increase/decrease time of the touch detection operation period Pt. Therefore, the display device with a touch detection function 1 according to the third embodiment enables high resolution or upsizing of the screen GS of the display unit with a touch detection function 10.

The display device with a touch detection function 1 according to the third embodiment supplies the touch drive signal Vonmt to the touch detecting device 30 so as to operate, when the noise detector 46 does not detect the noise, in a first display operation period Pd and a first touch detection operation period Pt in the standard period 1SF, then in a second touch detection operation period Pt and a second display operation period Pd in the standard period 2SF, and repeats the sequence of the standard period 1SF and the standard period 2SF. When the noise detector 46 detects the noise, the display device with a touch detection function 1 according to the third embodiment sets the first touch detection operation period Pt and the second touch detection operation period Pt as one touch detection operation period, and changes the frequency of the touch drive signal. This allows the two touch detection operation periods Pt to be successively executed. Therefore, the display device with a touch detection function 1 according to the third embodiment can execute the touch detection operation per drive signal applied block Ai without spreading over the display operation period Pd even if the waveform VcomUt of the touch drive signal Vcomt is changed to the waveform VcomNt. As a result, the display device with a touch detection function 1 according to the third embodiment can reduce the influence of the display drive signal Vcomd, thus improving the noise resistance characteristics.

1-4. Other modifications

The embodiments have been explained so far using some embodiments and the modification. However, the present disclosure is not limited thereto, and various modifications are therefore possible.

The embodiment is configured to drive and scan the drive electrode COML for each drive signal applied block Ai as explained in the first embodiment; however, the embodiment is not limited thereto. Therefore, instead of this configuration, it may be configured to drive, for example, a predetermined number of drive electrodes COML while shifting the drive electrodes COML one line by one line.

The display device with a touch detection function 1 according to the embodiments and the modification may integrate the touch detecting device 30 with the liquid-crystal display unit 20 using a liquid crystal in various mode such as TN, VA, and ECB, to configure the display unit with a touch detection function 10. Instead of this configuration, the display unit with a touch detection function 10 may integrate the touch detecting unit with the liquid-crystal display unit using a liquid crystal in the horizontal electric field mode such as fringe field switching (FFS) or in-plane switching (IPS).

Figure 25:
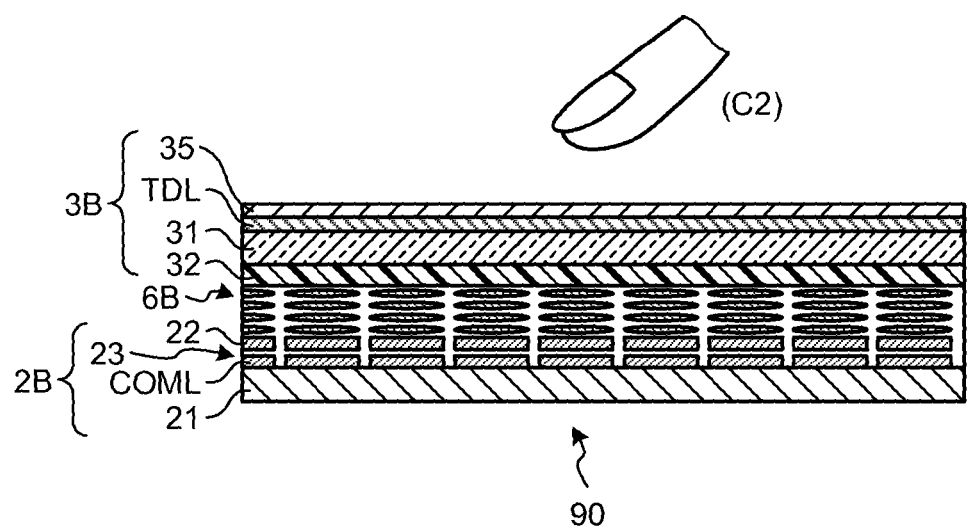

For example, when a liquid crystal in the horizontal electric field mode is used, the display device with a touch detection function 1 can configure the display unit with a touch detection function 90 as illustrated in FIG. 25. FIG. 25 is an example of a main-portion cross-section structure of the display unit with a touch detection function 90, and represents a state in which a liquid crystal layer 6B is sandwiched between a pixel substrate 2B and a counter substrate 3B. The names, the functions, and the like of the rest of the units are the same as these of FIG. 7, and explanation thereof is therefore repeated. In the example, unlike the case of FIG. 7, the drive electrodes COML used for both display and touch detection are formed over the TFT substrate 21 to form part of the pixel substrate 2B. The pixel electrodes 22 are arranged above the drive electrodes COML via an insulating layer 23. In this case, all dielectric bodies including the liquid crystal layer 6B between the drive electrodes COML and the touch detection electrodes TDL contribute to formation of the capacitive element C1.

For example, the embodiments are configured to use the so-called in-cell type device in which the liquid-crystal display unit and the touch detecting unit are integrated; however, the embodiment is not limited thereto. Instead of this configuration, for example, a capacitive-type touch detecting unit may be mounted on a liquid-crystal display unit. In this case, also, the configuration as described above allows touch detection with the influence of external noise and/or of noise transmitted from the liquid-crystal display unit (which corresponds to the internal noise according to the embodiments) reduced.

2. Application Examples

Application examples of the display device with a touch detection function 1 as explained in the embodiments and the modification will be explained below with reference to FIG. 26 to FIG. 37. FIG. 26 to FIG. 37 are diagrams of examples of an electronic apparatus to which the display device with a touch detection function according to the present embodiment is applied. The display device with a touch detection function 1 according to the first, the second, the third embodiments, and the modification can be applied to electronic apparatuses in all areas such as television devices, digital cameras, notebook personal computers, portable electronic apparatuses such as a mobile telephone, or video cameras. In other words, the display device with a touch detection function according to the first, the second, the third embodiments, and the modification can be applied to electronic apparatuses in all areas that display an externally input video signal or an internally generated video signal as an image or a video.

Application Example 1

Figure 26:
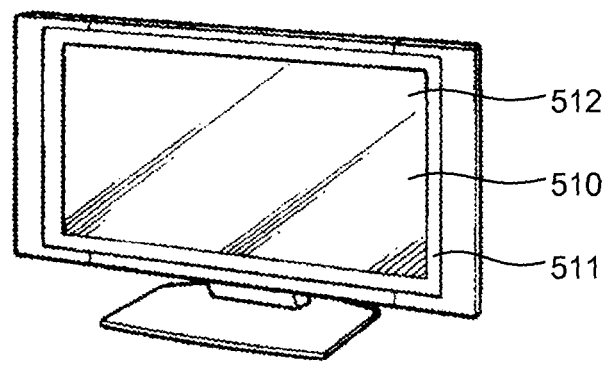
FIG. 26 is a diagram of an example of an electronic apparatus that applies the display device with a touch detection function according to the embodiment.

The electronic apparatus illustrated in FIG. 26 is a television device to which the display device with a touch detection function according to the first, the second, the third embodiments, and the modification is applied. Examples of the television device include, but are not limited to, a video display screen unit 510 including a front panel 511 and a filter glass 512, and the video display screen unit 510 is the display device with a touch detection function according to the first, the second, the third embodiments, and the modification.

Application Example 2

Figure 27:
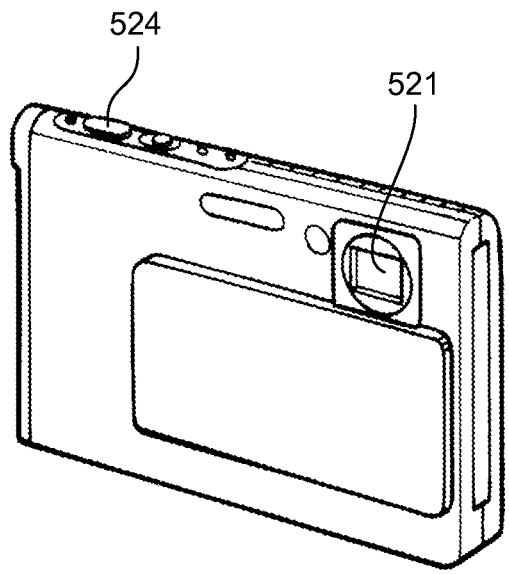
FIG. 27 is a diagram of an example of an electronic apparatus that applies the display device with a touch detection function according to the embodiment.
Figure 28:
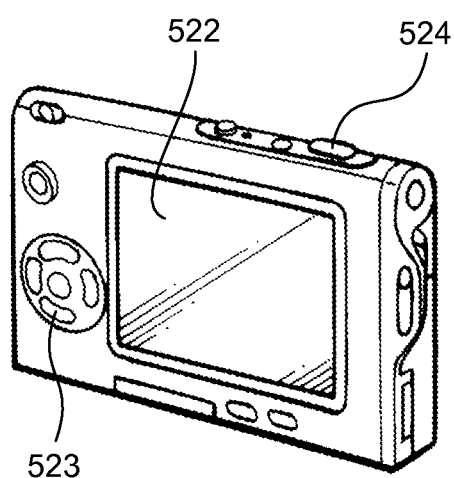
FIG. 28 is a diagram of an example of the electronic apparatus that applies the display device with a touch detection function according to the embodiment.

The electronic apparatus illustrated in FIG. 27 and FIG. 28 is a digital camera to which the display device with a touch detection function according to the first, the second, the third embodiments, and the modification is applied. Examples of the digital camera include, but are not limited to, a light emitting unit 521 for a flash, a display unit 522, a menu switch 523, and a shutter button 524, and the display unit 522 is the display device with a touch detection function according to the first, the second, the third embodiments, and the modification.

Application Example 3

Figure 29:
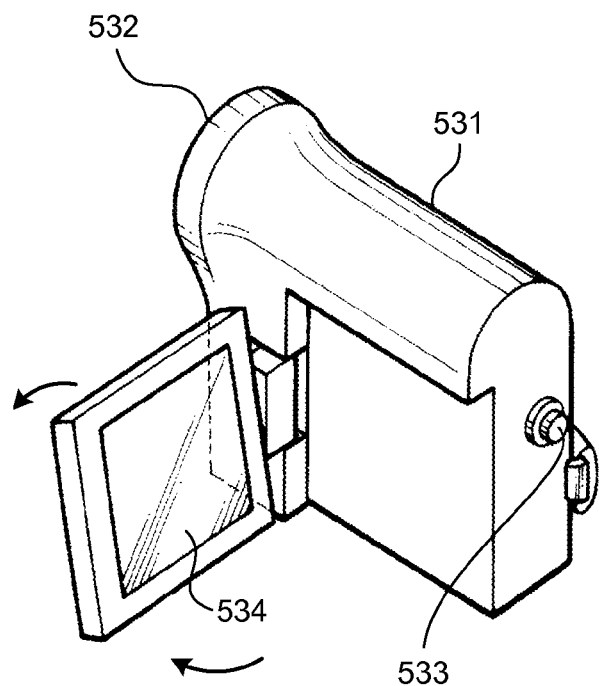
FIG. 29 is a diagram of an example of an electronic apparatus that applies the display device with a touch detection function according to the embodiment.

The electronic apparatus illustrated in FIG. 29 represents an appearance of a video camera to which the display device with a touch detection function according to the first, the second, the third embodiments, and the modification is applied. Examples of the video camera include, but are not limited to, a main body 531, a lens 532 for photographing a subject provided on the front side face of the main body 531, a start/stop switch 533 in photographing, and a display unit 534. The display unit 534 is the display device with a touch detection function according to the first, the second, the third embodiments, and the modification.

Application Example 4

Figure 30:
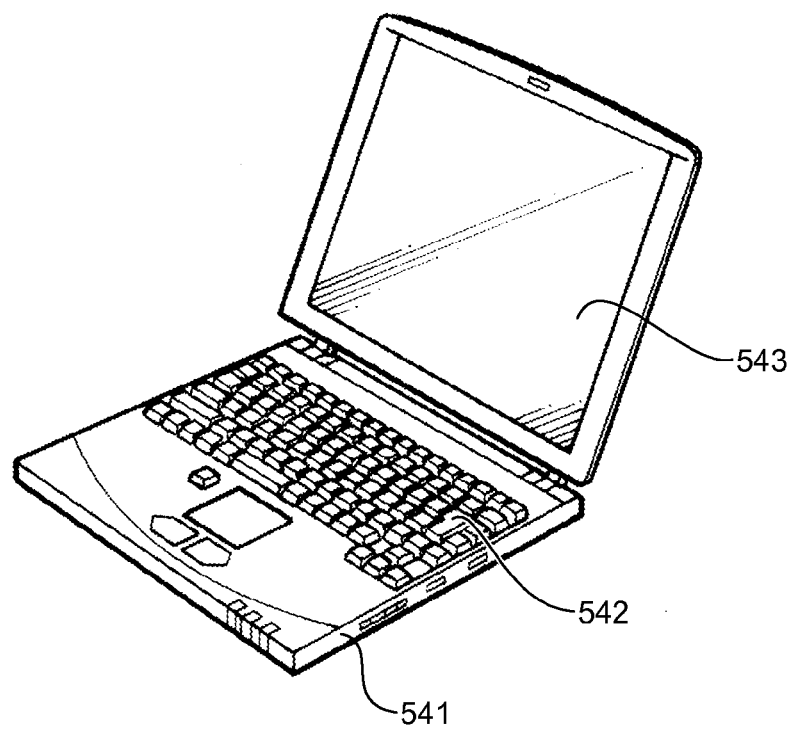
FIG. 30 is a diagram of an example of an electronic apparatus that applies the display device with a touch detection function according to the embodiment.
Figure 31:
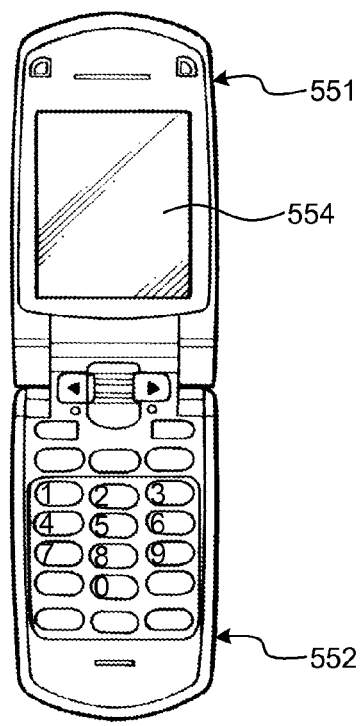
FIG. 31 is a diagram of an example of an electronic apparatus that applies the display device with a touch detection function according to the embodiment.
Figure 32:
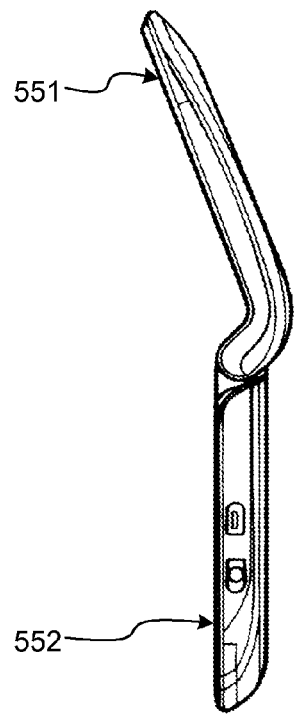
FIG. 32 is a diagram of an example of the electronic apparatus that applies the display device with a touch detection function according to the embodiment.
Figure 33:
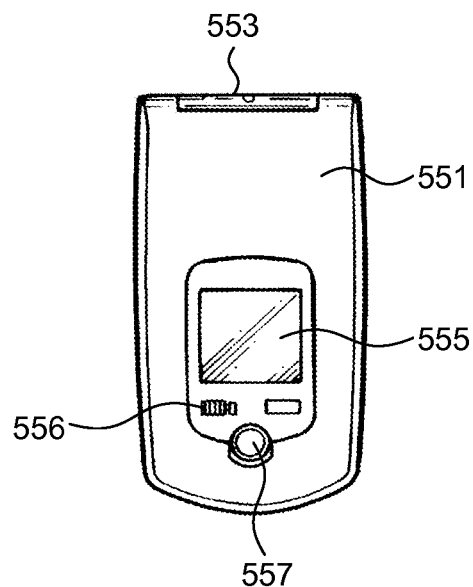
FIG. 33 is a diagram of an example of the electronic apparatus that applies the display device with a touch detection function according to the embodiment.
Figure 34:
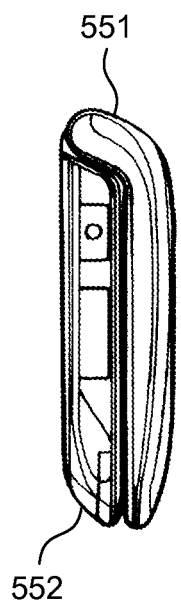
FIG. 34 is a diagram of an example of the electronic apparatus that applies the display device with a touch detection function according to the embodiment.
Figure 35:
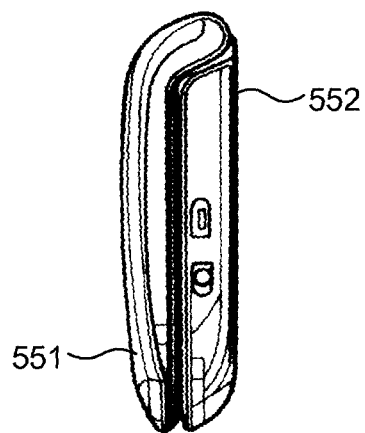
FIG. 35 is a diagram of an example of the electronic apparatus that applies the display device with a touch detection function according to the embodiment.
Figure 36:
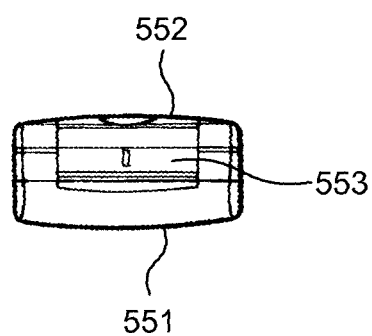
FIG. 36 is a diagram of an example of the electronic apparatus that applies the display device with a touch detection function according to the embodiment.
Figure 37:
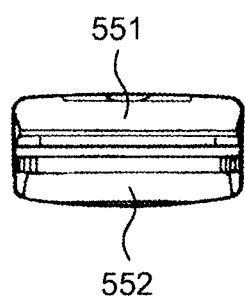
FIG. 37 is a diagram of an example of the electronic apparatus that applies the display device with a touch detection function according to the embodiment.

The electronic apparatus illustrated in FIG. 30 is a notebook personal computer to which the display device with a touch detection function according to the first, the second, the third embodiments, and the modification is applied. Examples of the notebook personal computer include, but are not limited to, a main body 541, a keyboard 542 for performing an input operation of text and the like, and a display unit 543 that displays an image. The display unit 543 is the display device with a touch detection function according to the first, the second, the third embodiments, and the modification.

Application Example 5

The electronic apparatus illustrated in FIG. 31 to FIG. 37 is a mobile phone to which the display device with a touch detection function according to the first, the second, the third embodiments, and the modification is applied. The mobile phone is configured to connect, for example, an upper housing 551 and a lower housing 552 with a connection (hinge portion) 553, and include a display 554, a sub-display 555, a picture light 556, and a camera 557. The display 554 or the sub-display 555 is the display device with a touch detection function according to the first, the second, the third embodiments, and the modification.

3. Aspects of Present Disclosure

The present disclosure includes aspects as follows.

(1) A display device with a touch detection function comprising:

a plurality of display elements that perform a display operation based on a pixel signal and a display drive signal;

a touch detection element that detects an external proximity object in accordance with a touch drive signal;

a scan drive unit that supplies the touch drive signal to the touch detection element in a touch detection operation period different from a display operation period in which the pixel signal and the display drive signal are sequentially supplied to the display elements to perform display scanning;

a touch detection unit that performs touch detection by sampling a detection result of the touch detection element at a timing synchronized with the touch drive signal; and a noise detector that detects noise included in a frequency component sampled by the touch detection unit, wherein the scan drive unit changes a frequency of the touch drive signal in the touch detection operation period and supplies the changed frequency to the touch detection element, when the noise detector detects the noise.

(2) The display device with a touch detection function according to (1), wherein, when the noise detector detects the noise, the scan drive unit changes a ratio of one touch report period, in which touch detection for one screen is performed, to one frame period in which the display scanning for the one screen is performed.

(3) The display device with a touch detection function according to (1) or (2), wherein, when the noise detector does not detect the noise, the scan drive unit supplies the touch drive signal to the touch detection element such that a sequence of a first display operation period, a first touch detection operation period, a second touch detection operation period, and a second display operation period is repeated, and, when the noise detector detects the noise, the scan drive unit sets the first touch detection operation period and the second touch detection operation period as one touch detection operation period, and changes a frequency of the touch drive signal.

(4) The display device with a touch detection function according to any one of (1) to (3), wherein the touch detection element uses a change in a capacitance in accordance with proximity or contact of the external proximity object to detect the external proximity object.

(5) The display device with a touch detection function according to any one of claims (1) to (3), further comprising a plurality of common drive electrodes arranged in parallel so as to be extended in one direction, wherein the scan drive unit applies the display drive signal to the common drive electrodes in the display operation period and applies the touch drive signal to the common drive electrodes in the touch detection operation period.

(6) A drive method of a display device with a touch detection function including a plurality of display elements that perform a display operation based on a pixel signal and a display drive signal, and a touch detection element that detects an external proximity object in accordance with a touch drive signal, the drive method comprising:

sequentially supplying the pixel signal and the display drive signal to the display elements in a time division manner to perform display scanning, in a display operation period;

supplying the touch drive signal to the touch detection element, in a touch detection operation period different from the display operation period;

performing touch detection by sampling a detection result of the touch detection element at a timing synchronized with the touch drive signal;

detecting noise included in a frequency component sampled in the performing touch detection; and changing a frequency of the touch drive signal to be supplied to the touch detection element in the touch detection operation period, when the noise is detected in the detecting.

(7) An electronic apparatus including a display device with a touch detection function, the display device with a touch detection function comprising:

a plurality of display elements that perform a display operation based on a pixel signal and a display drive signal;

a touch detection element that detects an external proximity object in accordance with a touch drive signal;

a scan drive unit that supplies the touch drive signal to the touch detection element in a touch detection operation period different from a display operation period in which the pixel signal and the display drive signal are sequentially supplied to the display elements in a time division manner to perform display scanning;

a touch detection unit that performs touch detection by sampling a detection result of the touch detection element at a timing synchronized with the touch drive signal; and a noise detector that detects noise included in a frequency component sampled by the touch detection unit, wherein the scan drive unit changes a frequency of the touch drive signal in the touch detection operation period and supplies the changed frequency to the touch detection element, when the noise detector detects the noise.

The electronic apparatus according to the present disclosure is provided with the display device with a touch detection function, and corresponds to, for example, television devices, digital cameras, personal computers, video cameras, or portable electronic apparatuses such as mobile telephones.

In the display device with a touch detection function, the drive method of the display device with a touch detection function, and the electronic apparatus according to the present disclosure, a touch detection operation is performed in the touch detection operation period different from the display operation period. At this time, if the noise is included in the detection result sent from the touch detection element, the frequency of the touch drive signal in the touch detection operation period is changed. Therefore, the frequency of external noise and the frequency at which the touch detection signal is sampled are set to differ from each other.

According to one aspect of the present disclosure, the frequency of the external noise and the frequency at which the touch drive signal is sampled are prevented from overlapping each other, thus allowing to perform touch detection with the influence of the noise reduced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A display device with a touch detection function comprising:
    a plurality of display elements that perform a display operation based on a pixel signal and a display drive signal;
    a touch detection element that detects an external proximity object in accordance with a touch drive signal;
    a scan drive unit that supplies the touch drive signal to the touch detection element in a touch detection operation period different from a display operation period in which the pixel signal and the display drive signal are sequentially supplied to the display elements to perform display scanning;
    a touch detection unit that performs touch detection by sampling a detection result of the touch detection element at a timing synchronized with the touch drive signal; and
    a noise detector that detects noise included in a frequency component sampled by the touch detection unit, wherein
    the scan drive unit changes a frequency of the touch drive signal in the touch detection operation period and supplies the changed frequency to the touch detection element, when the noise detector detects the noise,
    when the noise detector does not detect the noise, the scan drive unit supplies the touch drive signal to the touch detection element such that a sequence of a first display operation period, a first touch detection operation period, a second touch detection operation period, and a second display operation period is repeated, and
    when the noise detector detects the noise, the scan drive unit sets the first touch detection operation period and the second touch detection operation period as one touch detection operation period, and changes the frequency of the touch drive signal.

2. The display device with a touch detection function according to claim 1, wherein, when the noise detector detects the noise, the scan drive unit changes a ratio of one touch report period, in which touch detection for one screen is performed, to one frame period in which the display scanning for the one screen is performed.

3. The display device with a touch detection function according to claim 1, wherein the touch detection element uses a change in a capacitance in accordance with proximity or contact of the external proximity object to detect the external proximity object.

4. The display device with a touch detection function according to claim 1, further comprising a plurality of common drive electrodes forming a capacitance with a plurality of touch detection elements, wherein
    the scan drive unit applies the display drive signal to the common drive electrodes in the display operation period and applies the touch drive signal to the common drive electrodes in the touch detection operation period.

5. A drive method of a display device with a touch detection function including
    a plurality of display elements that perform a display operation based on a pixel signal and a display drive signal, and
    a touch detection element that detects an external proximity object in accordance with a touch drive signal, the drive method comprising:
    sequentially supplying the pixel signal and the display drive signal to the display elements in a time division manner to perform display scanning, in a display operation period;
    supplying the touch drive signal to the touch detection element, in a touch detection operation period different from the display operation period;
    performing touch detection by sampling a detection result of the touch detection element at a timing synchronized with the touch drive signal;
    detecting noise included in a frequency component sampled in the performing touch detection;
    changing a frequency of the touch drive signal to be supplied to the touch detection element in the touch detection operation period, when the noise is detected in the detecting;
    when the noise is not detected, supplying the touch drive signal to the touch detection element such that a sequence of a first display operation period, a first touch detection operation period, a second touch detection operation period, and a second display operation period is repeated; and
    when the noise is detected, setting the first touch detection operation period and the second touch detection operation period as one touch detection operation period, and changing the frequency of the touch drive sig.

6. An electronic apparatus including a display device with a touch detection function, the display device with a touch detection function comprising:
- a plurality of display elements that perform a display operation based on a pixel signal and a display drive signal;
- a touch detection element that detects an external proximity object in accordance with a touch drive signal;
- a scan drive unit that supplies the touch drive signal to the touch detection element in a touch detection operation period different from a display operation period in which the pixel signal and the display drive signal are sequentially supplied to the display elements in a time division manner to perform display scanning;
- a touch detection unit that performs touch detection by sampling a detection result of the touch detection element at a timing synchronized with the touch drive signal; and
- a noise detector that detects noise included in a frequency component sampled by the touch detection unit, wherein
the scan drive unit changes a frequency of the touch drive signal in the touch detection operation period and supplies the changed frequency to the touch detection element, when the noise detector detects the noise,
when the noise detector does not detect the noise, the scan drive unit supplies the touch drive signal to the touch detection element such that a sequence of a first display operation period, a first touch detection operation period, a second touch detection operation period, and a second display operation period is repeated, and
when the noise detector detects the noise, the scan drive unit sets the first touch detection operation period and the second touch detection operation period as one touch detection operation period, and changes the frequency of the touch drive signal.

* * * * *